US010548165B2

(12) United States Patent
Akkarakaran et al.

(10) Patent No.: US 10,548,165 B2
(45) Date of Patent: Jan. 28, 2020

(54) FLEXIBLE SCHEDULING IN NEW RADIO (NR) NETWORKS

(71) Applicant: QUALCOMM Incorporated, San Diego, CA (US)

(72) Inventors: Sony Akkarakaran, Poway, CA (US); Tao Luo, San Diego, CA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/961,446

(22) Filed: Apr. 24, 2018

(65) Prior Publication Data
US 2018/0310333 A1 Oct. 25, 2018

Related U.S. Application Data

(60) Provisional application No. 62/489,981, filed on Apr. 25, 2017.

(51) Int. Cl.
*H04W 72/14* (2009.01)
*H04W 72/04* (2009.01)
*H04W 72/12* (2009.01)

(52) U.S. Cl.
CPC ....... *H04W 72/14* (2013.01); *H04W 72/0406* (2013.01); *H04W 72/1268* (2013.01); *H04W 72/1278* (2013.01)

(58) Field of Classification Search
CPC ............. H04W 72/14; H04W 72/0406; H04W 72/042; H04W 72/1268; H04W 72/1278
See application file for complete search history.

(56) References Cited

U.S. PATENT DOCUMENTS

| 9,872,304 | B1* | 1/2018 | Ray | ........................... H04L 1/18 |
| 2009/0122754 | A1* | 5/2009 | Kang | .................. H04W 72/042 370/329 |
| 2012/0182961 | A1* | 7/2012 | Kim | ...................... H04L 1/1893 370/329 |
| 2015/0333898 | A1* | 11/2015 | Ji | ...................... H04W 72/1257 370/280 |

(Continued)

FOREIGN PATENT DOCUMENTS

EP 2472762 A2 7/2012

OTHER PUBLICATIONS

International Search Report and Written Opinion—PCT/US2018/029470—ISA/EPO—dated Jul. 20, 2018.

*Primary Examiner* — Chi H Pham
*Assistant Examiner* — Weibin Huang
(74) *Attorney, Agent, or Firm* — Loza & Loza, LLP

(57) ABSTRACT

Aspects of the present disclosure provide a mechanism for flexible scheduling of grants for downlink or uplink transmissions. In some examples, a grant may be scheduled using multiple control signals, where subsequent control signals may modify one or more properties of the grant. For example, the grant may be modified to add a packet to the grant for transmission on a different set of time-frequency resources or a different set of multiple-input multiple-output (MIMO) layers, modify a time-frequency resource allocation of the grant, modify the waveform utilized for the grant, modify the transmit-diversity scheme utilized for the grant, or indicate specific processing for the packet.

60 Claims, 21 Drawing Sheets

(56) References Cited

U.S. PATENT DOCUMENTS

2015/0334709 A1* 11/2015 Ji ...................... H04W 72/0453
                                                                    370/330
2017/0347351 A1* 11/2017 Cai ......................... H04W 4/70
2017/0359849 A1* 12/2017 Zhang ............... H04W 52/0216

* cited by examiner

DL-Centric
Slot

UL-Centric Slot

FLEXIBLE SCHEDULING IN NEW RADIO (NR) NETWORKS

PRIORITY CLAIM

This application claims priority to and the benefit of Provisional Patent Application No. 62/489,981 filed in the U.S. Patent and Trademark Office on Apr. 25, 2017, the entire content of which is incorporated herein by reference as if fully set forth below in its entirety and for all applicable purposes.

TECHNICAL FIELD

The technology discussed below relates generally to wireless communication systems, and more particularly, to scheduling of downlink and uplink transmissions in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

Legacy (e.g., 4G) wireless communication networks, such as the Long Term Evolution (LTE) network, may allow multiple packets to be transmitted to the same user equipment (UE) on different time-frequency resources within the same subframe. However, there are scheduling restrictions on the types of transmissions allowed for the same UE when different time-frequency resources are being utilized within the same subframe. In particular, a UE may not receive multiple unicast transmissions (e.g., transmissions from a base station to a single UE) on different time-frequency resources within the same subframe.

In general, once a base station reserves downlink time-frequency resources within a subframe for the transmission of a packet to one or more UEs, the base station generates a physical downlink control channel (PDCCH) containing downlink control information (DCI) indicating the reserved resources for the packet and scrambles the DCI with a radio network temporary identifier (RNTI) that may be utilized by a UE to identify DCI containing information pertaining to that UE. To reduce the amount of decoding performed by the UE on the DCI, only one PDCCH/DCI may be scrambled with a UE-specific RNTI (e.g., Cell-RNTI or C-RNTI) for the UE within a subframe. Other packets that may be transmitted on different time-frequency resources within the same subframe may be, for example, broadcast packets (e.g., packets transmitted from the base station to multiple UEs). The DCI generated for a broadcast packet may be scrambled, for example, with a system RNTI (e.g., a System Information RNTI or SI-RNTI).

LTE networks further support the transmission of multiple packets to the same UE on the same time-frequency resources during the same subframe. However, the packets are spatially separated from one another utilizing a multiple-input-multiple-output (MIMO) approach. In this example, each packet may be assigned the same hybrid automatic repeat request (HARQ) process identifier (ID) to provide for acknowledgement of the packets. Each HARQ process ID identifies a respective stop and wait (SAW) parallel process running on the base station and the UE. In addition, the downlink assignments for both packets are included in the same PDCCH, and the same modulation and coding scheme (MCS) is utilized for both packets.

For next generation (e.g., 5G) networks, such as the New Radio network, additional flexibility in scheduling of packets for a UE may be needed to meet the stringent data speed and latency requirements.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to mechanisms for flexible scheduling of grants (e.g., downlink assignments or uplink grants) for user equipment (UEs). A base station may schedule a grant for a packet for a UE and transmit a first control channel (e.g., a PDCCH) including first control information (e.g., DCI) that includes the grant for the packet to the UE. The base station may then modify at least one property of the grant to produce grant modification information. For example, the base station may add a packet to the grant for transmission on a different set of time-frequency resources or a different set of MIMO layers, modify a time-frequency resource allocation of the grant, modify the waveform utilized for the grant, modify the transmit-diversity scheme utilized for the grant, or indicate specific processing for the packet. The base station may then transmit a second control channel including second control information that includes at least the grant modification information to the UE.

In some examples, the second control channel may be transmitted within the same slot as the first control channel, within a subsequent slot as the first control channel, or subsequent to transmission of the packet. In examples in which the grant modification information adds a packet to be transmitted within the same slot on a different set of MIMO layers, the same or different hybrid automatic repeat request (HARQ) process identifiers (IDs) may be assigned to each of the packets.

In one aspect of the disclosure, a method for a scheduling entity to schedule transmissions with a set of one or more scheduled entities in a wireless communication network is provided. The method includes scheduling a grant including a downlink assignment or an uplink grant for a first packet for a first scheduled entity of the set of one or more scheduled entities and transmitting a first control channel including first control information to the first scheduled entity, where the first control information includes the grant for the first packet. The method further includes modifying at least one property of a plurality of properties of the grant to produce grant modification information and transmitting a second control channel including second control information to the first scheduled entity, where the second control information includes at least the grant modification information.

Another aspect of the disclosure provides a scheduling entity in a wireless communication network. The scheduling entity includes a processor, a transceiver communicatively coupled to the processor, and a memory communicatively coupled to the processor. The processor is configured to schedule a grant including a downlink assignment or an uplink grant for a first packet for a first scheduled entity of a set of one or more scheduled entities in wireless communication with the scheduled entity and transmit a first control channel including first control information to the first scheduled entity, where the first control information includes the grant for the first packet. The processor is further configured to modify at least one property of a plurality of properties of the grant to produce grant modification information and transmit a second control channel including second control information to the first scheduled entity, where the second control information includes at least the grant modification information.

Another aspect of the disclosure provides a scheduling entity in a wireless communication network. The scheduling entity includes means for scheduling a grant including a downlink assignment or an uplink grant for a first packet for a first scheduled entity of a set of one or more scheduled entities in wireless communication with the scheduling entity and means for transmitting a first control channel including first control information to the first scheduled entity, where the first control information includes the grant for the first packet. The method further includes means for modifying at least one property of a plurality of properties of the grant to produce grant modification information and means for transmitting a second control channel including second control information to the first scheduled entity, where the second control information includes at least the grant modification information.

Another aspect of the disclosure provides a non-transitory computer-readable medium storing computer executable code. The non-transitory computer-readable medium includes code for causing a scheduling entity in a wireless communication network to schedule a grant including a downlink assignment or an uplink grant for a first packet for a first scheduled entity of a set of one or more scheduled entities in wireless communication with the scheduled entity and transmit a first control channel including first control information to the first scheduled entity, where the first control information includes the grant for the first packet. The non-transitory computer-readable medium further includes code for causing the scheduling entity to modify at least one property of a plurality of properties of the grant to produce grant modification information and transmit a second control channel including second control information to the first scheduled entity, where the second control information includes at least the grant modification information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
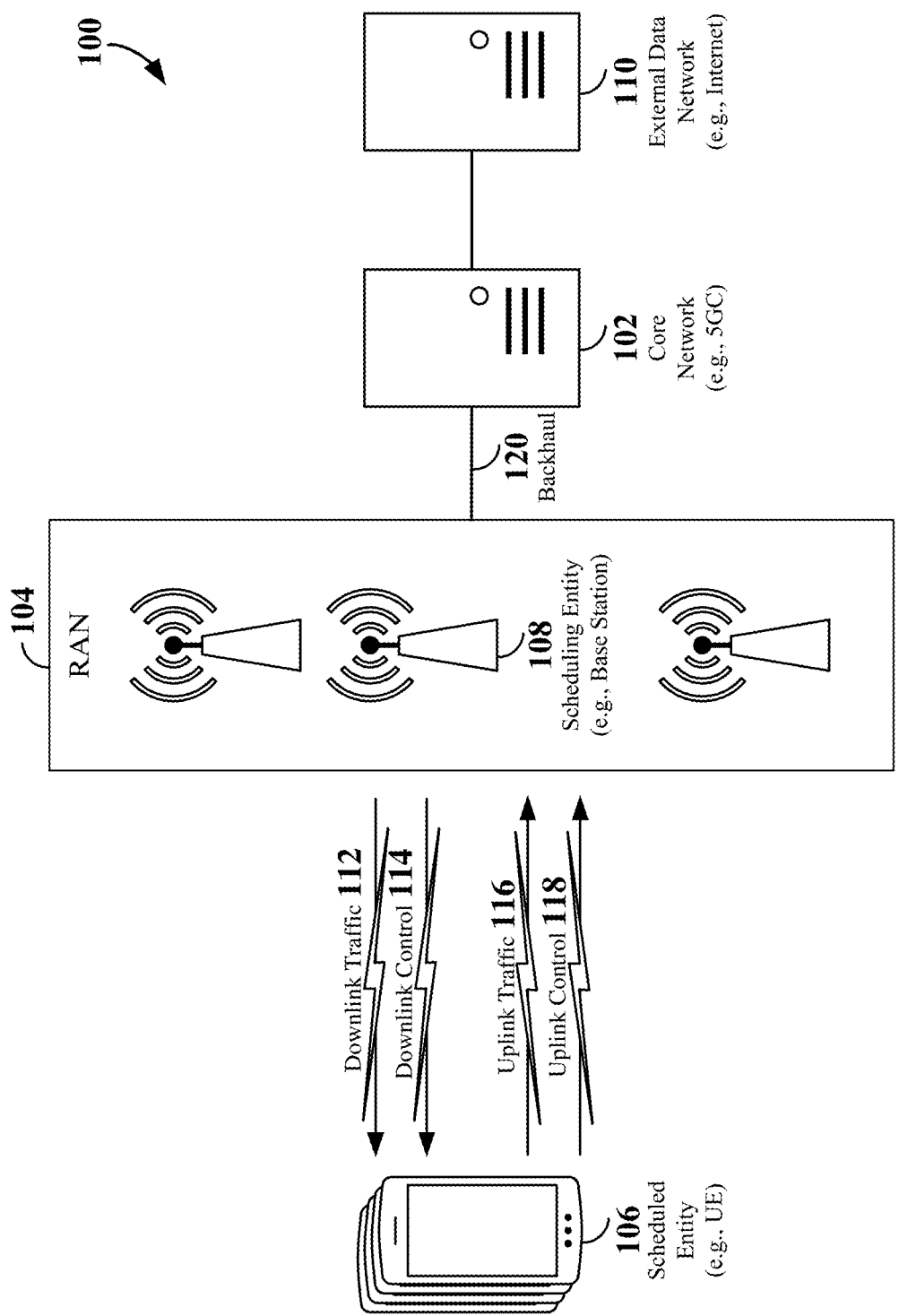
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
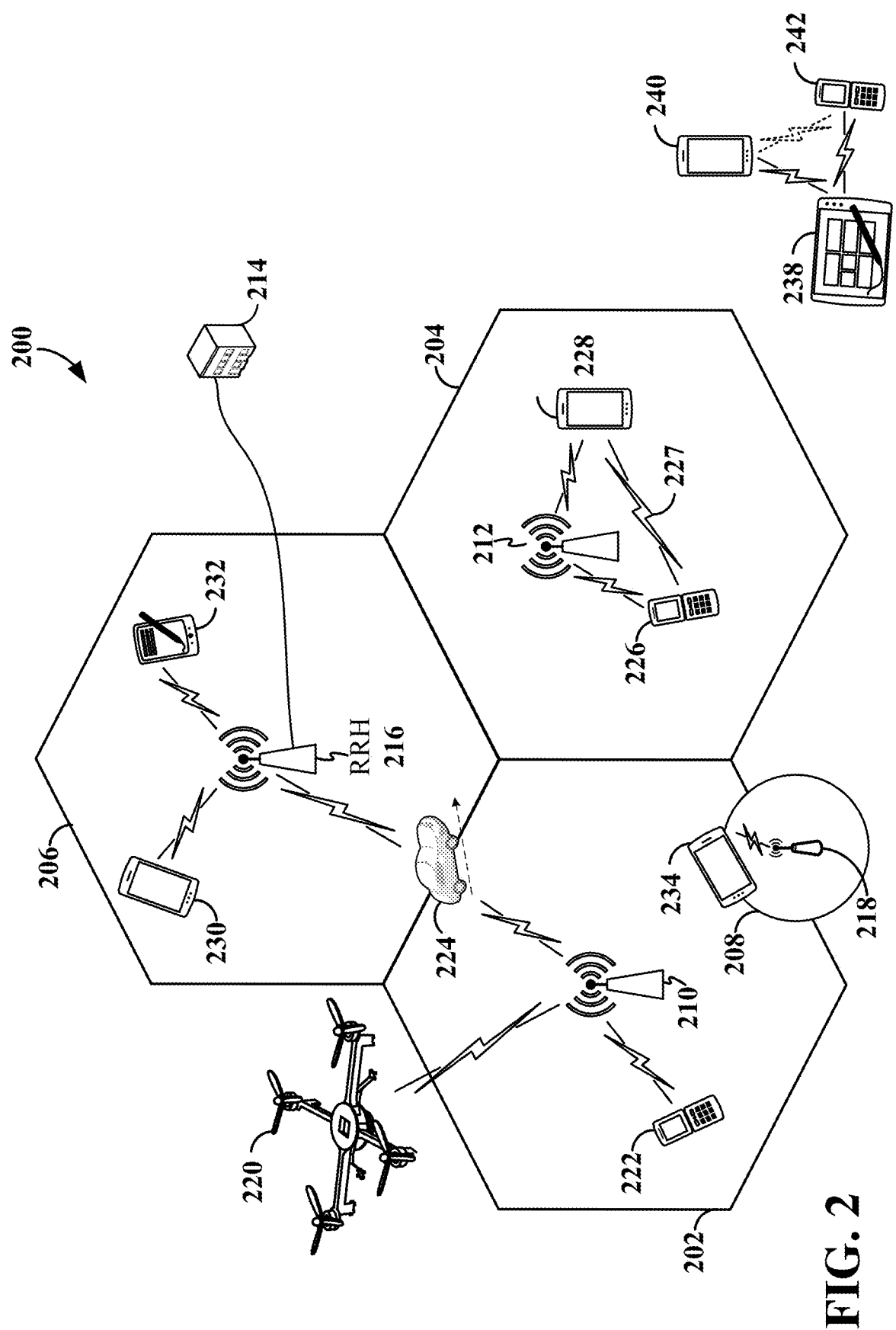
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
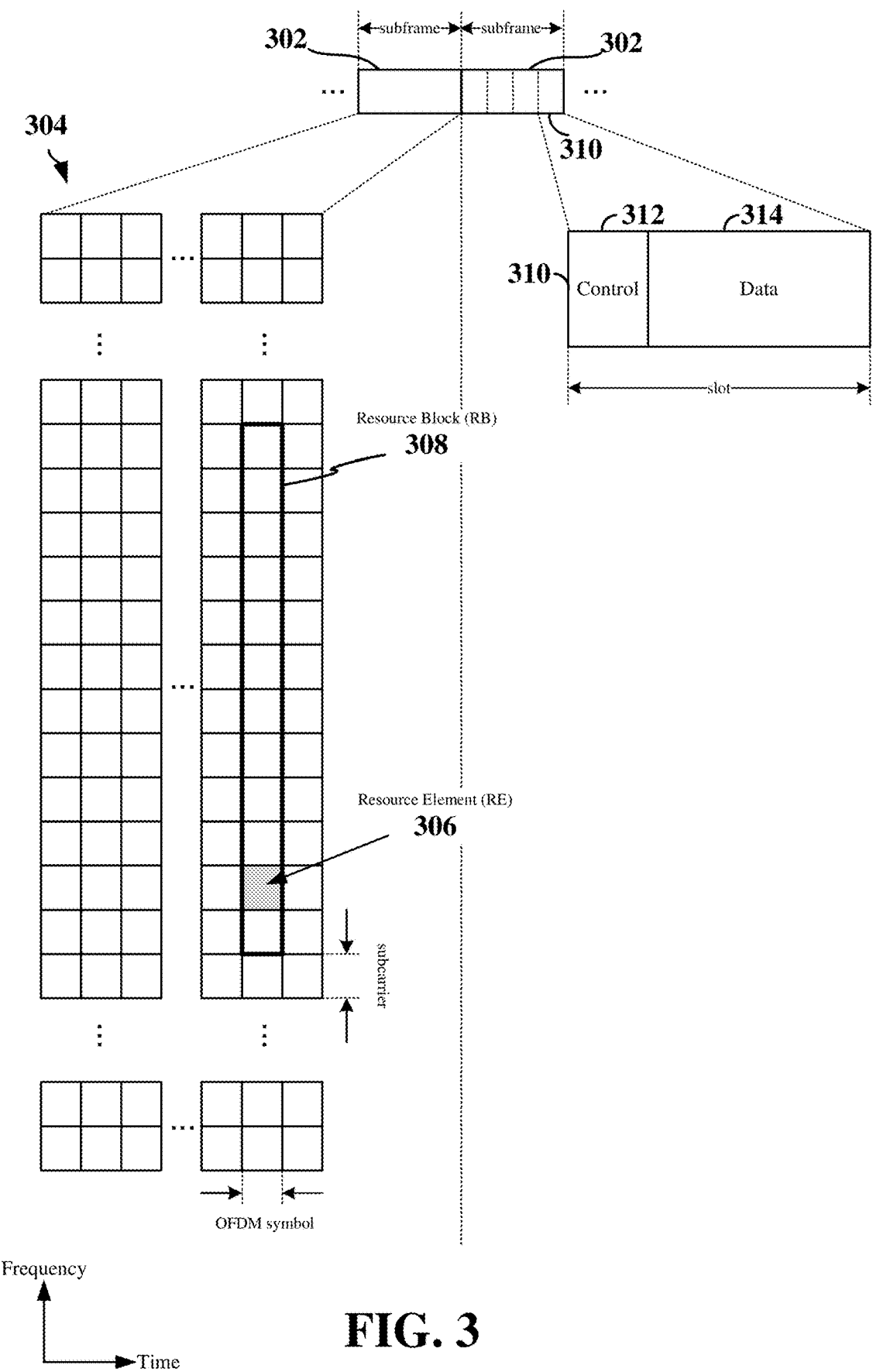
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG) or sub-band. A set of sub-bands may span the entire bandwidth. Scheduling of UEs (scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks or resource block groups (e.g., groups of sub-carriers and OFDM symbols) may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
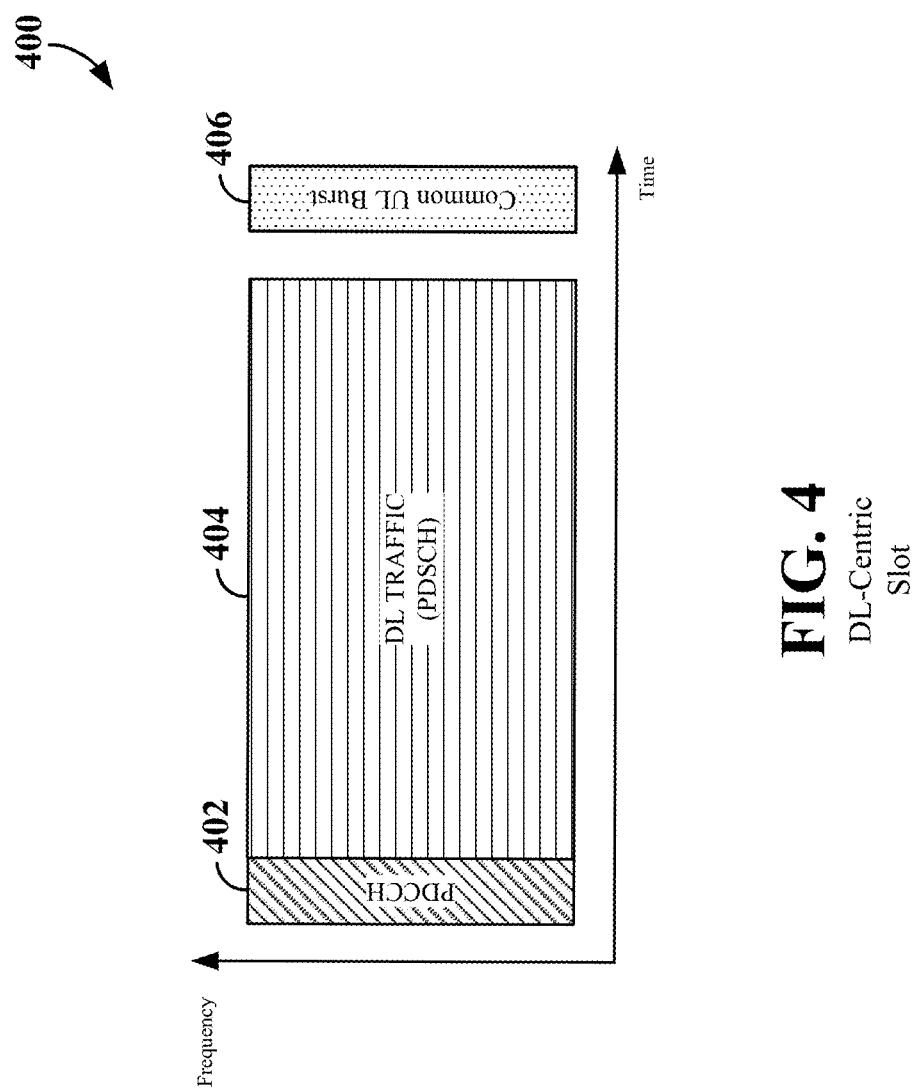
FIG. 4 is a diagram illustrating an example of a downlink (DL)-centric slot.
Figure 5:
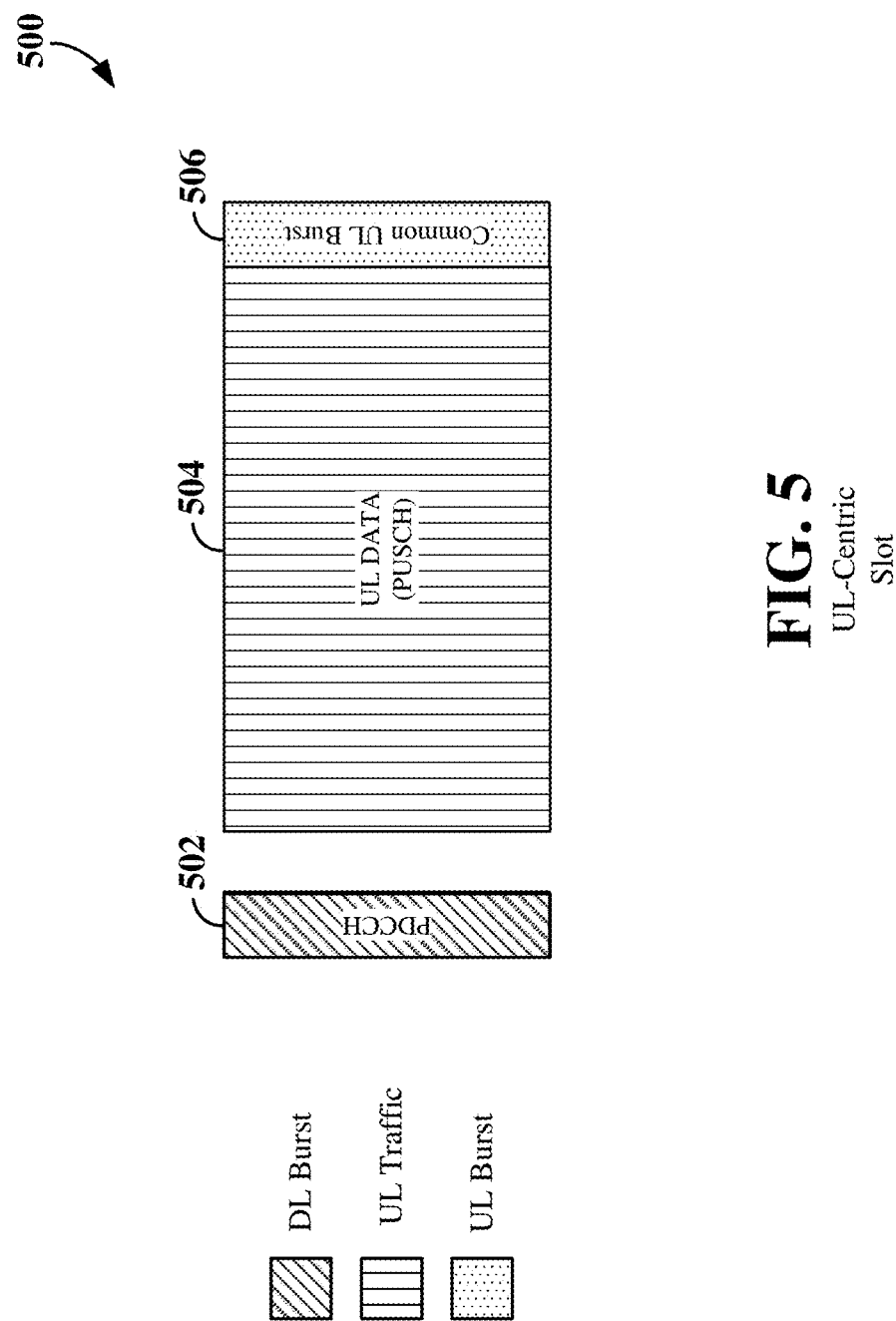
FIG. 5 is a diagram illustrating an example of an uplink (UL)-centric slot.

According to an aspect of the disclosure, one or more slots may be structured as self-contained slots. For example, FIGS. 4 and 5 illustrate two example structures of self-contained slots 400 and 500. The self-contained slots 400 and/or 500 may be used, in some examples, in place of the slot 310 described above and illustrated in FIG. 3.

FIG. 4 is a diagram illustrating an example of a downlink (DL)-centric slot 400 according to some aspects of the disclosure. The nomenclature DL-centric generally refers to a structure wherein more resources are allocated for transmissions in the DL direction (e.g., transmissions from the scheduling entity 108 to the scheduled entity 106). In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 108 (e.g., eNB) to the scheduled entity 106 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the DL burst 402 and/or DL traffic region 404. Non-limiting examples of feedback information may include an ACK signal, a NACK signal, a HARQ process identifier (ID), and/or various other suitable types of information. The UL burst 406 may include additional or alternative information, such as information pertaining to random access channel (RACH) procedures, scheduling requests (SRs) (e.g., within a PUCCH), and various other suitable types of information.

Here, a slot such as the DL-centric slot 400 may be referred to as a self-contained slot when all of the data carried in the DL traffic region 404 is scheduled in the DL burst 402 of the same slot; and further, when all of the data carried in the DL traffic region 404 is acknowledged (or at least has an opportunity to be acknowledged) in the UL burst 406 of the same slot. In this way, each self-contained slot may be considered a self-contained entity, not necessarily requiring any other slot to complete a scheduling-transmission-acknowledgment cycle for any given packet.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. The nomenclature UL-centric generally refers to a structure wherein more resources are allocated for transmissions in the UL direction (e.g., transmissions from the scheduled entity 106 to the scheduling entity 108). In the example shown in FIG. 5, time is illustrated along a horizontal axis, while frequency is illustrated along a vertical axis. The time-frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 106 (e.g., UE) to the scheduling entity 108 (e.g., eNB). In some configurations, the UL traffic region 504 may be a physical UL shared channel (PUSCH).

As illustrated in FIG. 5, the end of the DL burst 502 may be separated in time from the beginning of the UL traffic region 504. This time, separation may sometimes be referred to as a gap, guard period, guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)).

The UL burst 506 in FIG. 5 may be similar to the UL burst 406 described above with reference to FIG. 4. The UL burst 506 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

Figure 6:
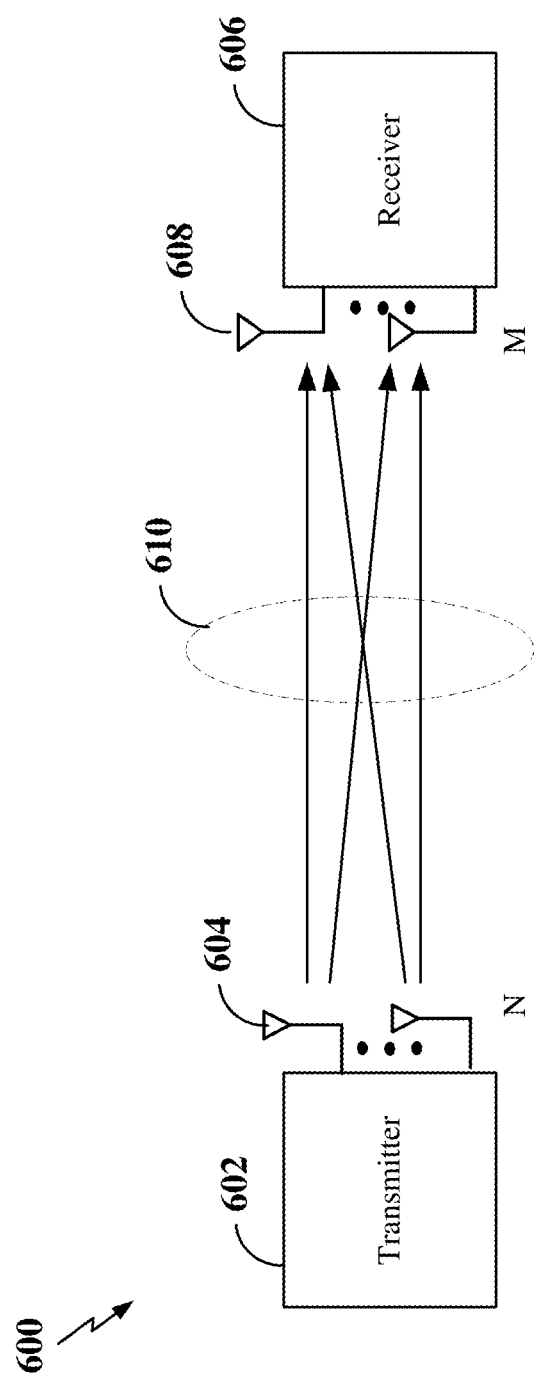
FIG. 6 is a diagram illustrating an example of a wireless communication system supporting Multiple Input Multiple Output (MIMO) technology.

FIG. 6 illustrates an example of a wireless communication system 600 supporting MIMO technology. In a MIMO system, a transmitter 602 includes multiple transmit antennas 604 (e.g., N transmit antennas) and a receiver 606 includes multiple receive antennas 608 (e.g., M receive antennas). Thus, there are N×M signal paths 610 from the transmit antennas 604 to the receive antennas 608. Each of the transmitter 602 and the receiver 606 may be implemented, for example, within a scheduled entity, a scheduling entity or other wireless communication device.

The use of MIMO technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The traffic streams may be transmitted to a single scheduled entity or UE to increase the data rate or to multiple scheduled entities or UEs to increase the overall system capacity, the latter being referred to as multi-user MIMO (MU-MIMO). This is achieved by spatially precoding each traffic stream (i.e., applying a scaling of an amplitude and a phase) and then transmitting each spatially precoded stream through a respective transmit antenna on the downlink. The spatially precoded traffic streams arrive at the UE(s) with different spatial signatures, which enables each of the UE(s) to recover the one or more traffic streams destined for that UE. On the uplink, each scheduled entity or UE transmits a spatially precoded traffic stream, which enables the scheduling entity to identify the source of each spatially precoded traffic stream.

The number of traffic streams or layers corresponds to the rank of the transmission. In general, the rank of the MIMO system 600 is limited by the number of transmit or receive antennas 604 or 608, whichever is lower. In addition, the channel conditions at the scheduled entity, as well as other considerations, such as the available resources at the scheduling entity, may also affect the transmission rank. For example, the rank (and therefore, the number of traffic streams) assigned to a particular scheduled entity on the downlink may be determined based on the rank indicator (RI) transmitted from the scheduled entity to the scheduling entity. The RI may be determined based on the antenna configuration (e.g., the number of transmit and receive antennas) and the signal to interference plus noise ratio (SINR) on each of the receive antennas. The RI may indicate, for example, the number of layers that may be supported under the current channel conditions. The scheduling entity may use the RI, along with resource information (e.g., the available resources and amount of data to be scheduled for the scheduled entity), to assign a transmission rank to the scheduled entity.

In Time Division Duplex (TDD) systems, the uplink and downlink are reciprocal in that each uses different time slots of the same frequency bandwidth. As such, in TDD systems, the scheduling entity may assign the rank based on uplink SINR measurements (e.g., based on a Sounding Reference Signal (SRS) transmitted from the scheduled entity or other pilot signal). Based on the assigned rank, the scheduling entity may then transmit the CSI-RS with separate C-RS sequences for each layer to provide for multi-layer channel estimation. From the CSI-RS, the scheduled entity may measure the channel quality across layers and resource blocks and feed-back the channel quality indicator (CQI), preceding matric indicator (PMI), and RI values to the scheduling entity for use in updating the rank and assigning resource elements for future downlink transmissions.

In the simplest case, as shown in FIG. 6, a rank-2 spatial multiplexing transmission on a 2×2 MIMO antenna configuration will transmit one traffic stream from each transmit antenna 604. Each traffic stream reaches each receive antenna 608 along a different signal path 610. The receiver 606 may then reconstruct the traffic streams using the received signals from each receive antenna 608.

In legacy (e.g., 4G) wireless communication networks, multiple packets (also referred to herein as transport blocks or codewords) may be scheduled within the same slot. However, there are a number of restrictions on scheduling. For example, when scheduling multiple DCI within a PDCCH, each DCI is scrambled with a different radio network temporary identifier (RNTI) to identify the recipient(s) of the DCI, thus limiting the types of grants that may be simultaneously scheduled. In addition, when multiple packets are scheduled on the same time-frequency resources, but spatially separated from one another utilizing MIMO, each packet is assigned the same hybrid automatic repeat request (HARQ) process identifier (ID), and the grant for both packets is included in the same PDCCH. Furthermore, the same modulation and coding scheme (MCS) is utilized for both packets.

In accordance with various aspects of the present disclosure, to provide flexibility in scheduling downlink transmissions and uplink transmissions in next generation (e.g., 5G) wireless communication networks, a grant (e.g., a downlink assignment or uplink grant) may be scheduled using multiple control signals, where subsequent control signals may modify one or more properties of the grant. In some examples, a grant for a packet indicated in first DCI of a first PDCCH may be modified by transmitting subsequent control information (e.g., second DCI) on a subsequent control channel (e.g., a second PDCCH). For example, the grant may be modified to add a packet to the grant for transmission on a different set of time-frequency resources or a different set of one or more MIMO layers within the same slot, modify a time-frequency resource allocation of the grant, modify the waveform utilized for the grant, modify the transmit-diversity scheme utilized for the grant, or indicate specific processing for the packet.

The first and second PDCCHs may be concurrent (e.g., within the same slot) or separated in time (e.g., transmitted within different slots). In some examples, the second PDCCH includes a new grant for an additional packet to be transmitted on one or more different MIMO layers of the same time-frequency resources or on one or more MIMO layers of different time-frequency resources within the same slot. When the same time-frequency resources are utilized for the initial packet and the additional packet, either the same HARQ process ID or different HARQ process IDs may be assigned to the packets. When different time-frequency resources are utilized for the additional packet, different HARQ process IDs may be assigned to each of the packets. The packets may further utilize different MCSs.

Figure 7:
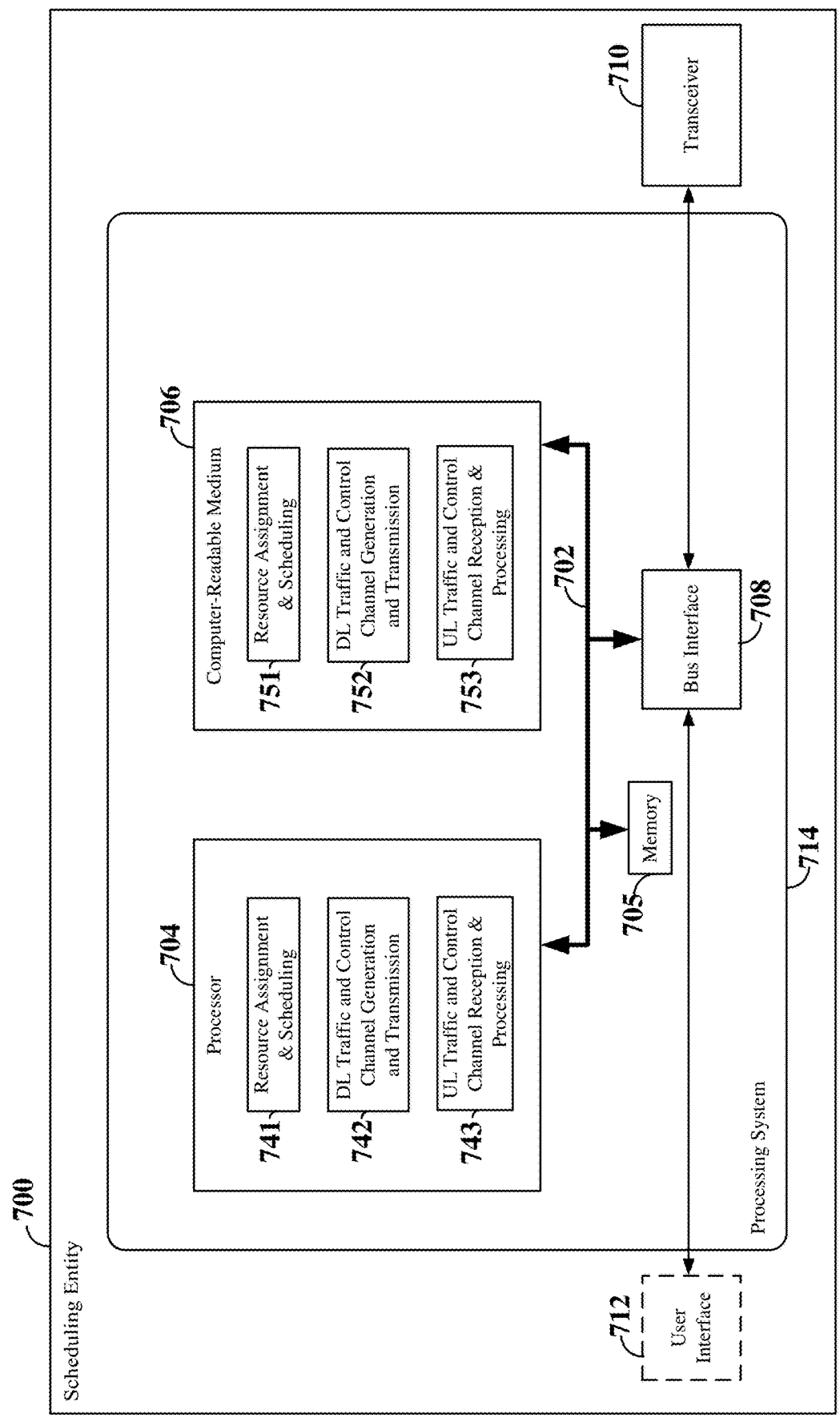
FIG. 7 is a block diagram illustrating an example of a hardware implementation for a scheduling entity employing a processing system according to some aspects of the present disclosure.

FIG. 7 is a conceptual diagram illustrating an example of a hardware implementation for an exemplary scheduling entity 700 employing a processing system 714. For example, the scheduling entity 700 may be a next generation (5G) base station as illustrated in any one or more of FIGS. 1 and 2. In another example, the scheduling entity 700 may be a user equipment (UE) as illustrated in any one or more of FIGS. 1 and 2.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes described below. The processor 704 may in some instances be implemented via a baseband or modem chip and in other implementations, the processor 704 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium (e.g., air interface). Depending upon the nature of the apparatus, a user interface 712 (e.g., keypad, display, speaker, microphone, joystick) may also be provided. Of course, such a user interface 712 is optional, and may be omitted in some examples, such as a base station.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include resource assignment and scheduling circuitry 741, configured to generate, schedule, and modify a resource assignment or grant of time-frequency resources (e.g., a set of one or more resource elements). For example, the resource assignment and scheduling circuitry 741 may schedule time-frequency resources within a plurality of time division duplex (TDD) and/or frequency division duplex (FDD) subframes, slots, and/or mini-slots to carry user data traffic and/or control information to and/or from multiple UEs (scheduled entities).

In various aspects of the disclosure, the resource assignment and scheduling circuitry 741 may be configured to initially schedule a grant (e.g., a downlink assignment or uplink grant) for a packet associated with a scheduled entity and subsequently modify one or more properties of the grant to produce grant modification information. For example, the grant modification information may indicate that additional resources have been reserved to transmit one or more additional packets (e.g., a different set of time-frequency resources or a different set of MIMO layers within the same slot), a time-frequency resource allocation of the grant has been modified, the waveform utilized for the grant has been modified, the transmit-diversity scheme utilized for the grant has been modified, or specific processing to be utilized for the packet.

In some examples, the resource assignment and scheduling circuitry 741 may generate a first physical downlink control channel (PDCCH) carrying first downlink control information (DCI) including the initial grant for transmission within a first slot and a second PDCCH carrying second DCI including the grant modification information for transmission within a second slot that occurs later in time that the first slot. For example, the second slot may include the physical downlink shared channel (PDSCH) or physical uplink shared channel (PUSCH) scheduled for transmission of the packet(s). In other examples, the grant modification information may be transmitted within a separate PDCCH in the same slot as the PDCCH containing the initial grant. In still other examples, the PDCCH containing the initial grant may include multiple DCI, each containing a separate grant for the scheduled entity (e.g., a dynamic grant, semi-persistently scheduled grant, and/or other types of grants), and the grant modification information may be transmitted within different DCI (e.g., later DCI) than the DCI containing the initial grant of the same PDCCH.

Thus, the resource assignment and scheduling circuitry 741 may utilize a concurrent or later PDCCH (or DCI within the same PDCCH) to modify a subset of the properties (e.g., fields, sections, or information) of another concurrent or previous PDCCH (or DCI within the same PDCCH) for a downlink or uplink grant (e.g., PDSCH or PUSCH) by modifying a value of one or more of the properties. In some examples, the previous PDCCH may be transmitted within the same slot on a previous OFDM symbol or in a previous slot, as discussed above.

In some examples, PDCCH properties and/or grants that may potentially be modified may be indicated within the PDCCH. For example, an indication that a PDCCH property and/or grant may be modified may include one or more bits that may inform the scheduled entity that the property and/or grant "may be modified," "will be modified," or "will not be modified" in a concurrent or subsequent PDCCH (or DCI within the same PDCCH). Thus, a final PDCCH (or DCI within the same PDCCH) for a set of resource elements within a slot may include the "will not be modified" indicator or other indicator that the PDCCH (or DCI within the same PDCCH) is a final PDCCH. Requiring a final PDCCH may avoid the need for multiple missed-grant hypotheses. In some examples, a first (or any previous) PDCCH (or DCI within the same PDCCH) may be ignored if a final PDCCH (or DCI within the PDCCH) finalizing the grant is missed. In some examples, separate final PDCCHs (or DCI within the same PDCCH) may be transmitted for different properties of a grant.

In some examples, to reduce the PDCCH overhead, a second DCI/PDCCH that modifies a first DCI/PDCCH may not include any unmodifiable information (e.g., any information that may not change from the first to the second DCI/PDCCH). In other examples, the second DCI/PDCCH may set the unmodifiable information to the same as the first DCI/PDCCH. If the unmodifiable information is set to the same as the first DCI/PDCCH at the PDCCH transmitter, and the PDCCH receiver at the scheduled entity determines that this information is not the same in the first and the second DCI/PDCCH, the scheduled entity may ignore both the first and second DCI/PDCCHs.

In some examples, the second DCI/PDCCH may include a pointer to the first DCI/PDCCH. For example, the pointer may be an explicit pointer to the first DCI/PDCCH (e.g., a pointer to the DCI/PDCCH transmitted on control resource set #i within slot N). As another example, the pointer may be an implicit pointer conveyed by the time-frequency resources (e.g., control resource set #) carrying the second DCI/PDCCH.

In some examples, after scheduling the initial grant, the resource assignment and scheduling circuitry 741 may determine that the channel between the scheduling entity 700 and the scheduled entity can support one or more additional MIMO layers (e.g., based on an updated CQI or SRS received from the scheduled entity) or may determine that an additional urgent packet (e.g., an Ultra Reliable Low Latency Communication (URLLC) packet) may need to be transmitted to the scheduled entity, and may therefore generate the grant modification information for the additional packet. For example, the resource assignment and scheduling circuitry 741 may be configured to generate a first control signal (e.g., downlink control information (DCI) within a physical downlink control channel (PDCCH)) within a first slot that includes a grant for the transmission of a first packet within a first set of resource elements (e.g., first set of time-frequency resources) and on one or more MIMO layers of a second slot (which may, in some examples, be the same as the first slot). The resource assignment and scheduling circuitry 741 may then be configured to generate a second control signal within the first slot or a subsequent slot (e.g., a slot prior to or the same as the second slot) that includes grant modification information for the transmission of a second packet within a second set of resource elements and on one or more additional MIMO layers within the second slot. In some examples, the first and second sets of resource elements are the same.

For example, a first PDCCH transmitted in slot n1 may schedule a PDSCH (or PUSCH) within slot n1+k01, where k01 represents a delay or offset from slot n1. In addition, a second PDCCH transmitted in slot n2 may include grant modification information that schedules an additional PDSCH (or PUSCH) within slot n2+k02, where k02 represents a delay or offset from slot n2. It should be noted that k01 and k02 may represent delays in terms of slots, mini-slots or other suitable units of time, such as chip duration or sample duration of a waveform. When n1+k01=n2+k02 and each PDCCH grants the same resource block(s) on different MIMO spatial layers, this results in the two PDSCHs (or two PUSCHs) being simultaneously scheduled on the same time-frequency resources.

In addition, the resource assignment and scheduling circuitry 741 may assign the same modulation and coding scheme (MCS) to each of the packets or may assign a different MCS to the second packet (e.g., based on an updated MCS index received from the scheduled entity). If the same MCS is utilized, the MCS may not be included in the DCI for the second packet. In this example, the scheduled entity will infer the MCS for the second packet from the MCS included in the initial grant for the first packet. In some examples, the wireless network may not allow the MCS to change between the first and second packets. In this example, if the grant modification information includes a different MCS, the scheduled entity may ignore the grant modification information.

The resource assignment and scheduling circuitry 741 may further schedule the same HARQ process ID for both packets or different HARQ process IDs for the packets. In some examples, different HARQ process IDs may be used for each of the packets when the initial grant and the grant modification information are transmitted within different PDCCH. In other examples, different HARQ process IDs may be used for each of the packets when the resource assignment and scheduling circuitry 741 schedules different time-frequency resources within the same slot for each of the packets. The number of HARQ process IDs is configurable, and may be determined, for example, based on the type of duplexing (e.g., TDD or FDD), the subframe or slot structure, and other factors. Each HARQ process ID identifies a respective stop and wait (SAW) parallel process running on the scheduling entity and the scheduled entity.

The resource assignment and scheduling circuitry 741 may further reserve time-frequency resources for the transmission of acknowledgement information (e.g., ACK or NACK) for each of the packets. In some examples, the resource assignment and scheduling circuitry 741 may utilize a block ACK, in which time-frequency resources are automatically reserved for a maximum number of packets that a scheduled entity may simultaneously receive (e.g., on the same time-frequency resources), which may be based, for example, on the maximum rank supported by a scheduled entity. For example, the maximum rank may be either four or eight.

If the resource assignment and scheduling circuitry 741 utilizes a block ACK and the spatially transmitted packets have the same HARQ process ID, the resource assignment and scheduling circuitry 741 may not schedule additional ACK resources for each new packet that is simultaneously transmitted to a scheduled entity on different MIMO streams. However, when different HARQ process ID's are utilized for each of the packets, the resource assignment and scheduling circuitry 741 may schedule separate subfields for each HARQ process ID within a block ACK.

For packets having the same HARQ process ID, if there are less ACK bits reserved than spatially transmitted packets, the resource assignment and scheduling circuitry 741 may utilize an ACK-bundling scheme in which a single ACK bit is utilized for more than one packet. Thus, if either packet is not received correctly at the scheduled entity (or scheduling entity for PUSCH transmissions), the scheduled entity (or scheduling entity) transmits a NACK on the ACK bit. ACK bundling works well when all packets are scheduled in the same DCI (e.g., upon successfully decoding the DCI, the scheduled entity has knowledge of the number of packets to be acknowledged). However, when bundling across multiple DCI, as in various aspects of the present disclosure, either an ACK may also include the number of packets received or the scheduled entity may be informed of the number of packets associated with the ACK bundle for PDSCH grants. In some examples, one or more of the DCI may include the total number of packets to be acknowledged in the ACK bundle.

In some examples, each of the packets may have a different retransmission sequence number (RSN)/redundancy version (RV). The RSN indicates the number of times the same packet has been retransmitted, while the RV indicates the specific configuration of systematic and parity bits utilized in the retransmission. Thus, for example, one of the packets may be a new packet, while the other packet may be a retransmission of a NACKed packet. In some examples, the retransmitted packet may utilize the same beam-direction as the new packet.

In some examples, if both the first and second packets are new packets, the grant modification information may modify the initial grant to allocate additional resources to accommodate a single larger packet containing both the first and second new packets. In this example, each of the first and second new packets may utilize the same HARQ process ID and same RSN/RV for retransmissions thereof. In other examples, each of the first and second packets may be separately acknowledged, as described above.

In some examples, the resource assignment and scheduling circuitry 741 may determine that a low latency packet (e.g., a URLLC packet) of control and/or user data traffic for the same or a different scheduled entity may need to puncture the initial grant. In this example, the resource assignment and scheduling circuitry 741 may transmit a second PDCCH including grant modification information that modifies the initial grant. For example, the second PDCCH may modify the start and/or end of the grant (e.g., starting OFDM symbol and/or ending OFDM symbol) or the transmit bandwidth (e.g., number of resource blocks) to accommodate the puncturing. In some examples, the MCS may not change, and the transport block size computation may automatically adapt to the revised number of resource elements (REs) in the grant.

In some examples, the second PDCCH may be transmitted in a slot subsequent to the slot containing the packet to indicate specific processing to be applied to the packet as a result of the puncturing. In this example, the RB allocation of the packet is not changed, but the scheduled entity is provided with puncturing information that indicates the resources punctured and any special processing to be utilized for the punctured packet.

In some examples, the second PDCCH may carry DCI including a pre-emption indicator that indicates the specific resource elements (REs) that have been punctured for a DL assignment or an UL grant. In examples in which REs for multiple UEs have been punctured, the pre-emption indicator DCI may be multi-cast (i.e., sent to two or more UEs), and each UE may be configured to extract the puncturing information relevant to that UE. In some examples, the second PDCCH may carry DCI including a slot format indicator (SFI) that indicates whether each of the OFDM symbols within a slot is a DL symbol, an UL symbol, or a flexible symbol that may be utilized for DL or UL. In this example, the SFI may modify one or more flexible OFDM symbols within a slot to be either DL symbols or UL symbols, which may have the effect of cancelling a prior semi-statically scheduled transmission (or puncturing the semi-statically scheduled transmission) on those symbols. In some examples, the second PDCCH may indicate that an additional UL grant has been scheduled on overlapping UL time-frequency resources associated with a previously scheduled UL transmission of control and/or data scheduled for a UE, and the UE may utilize predetermined dropping rules to determine that the later-scheduled overlapping UL grant will puncture at least a portion of the previously scheduled UL grant for the UE. The resource assignment and scheduling circuitry 741 may further operate in coordination with resource assignment and scheduling software 751.

The processor 704 may further include downlink (DL) traffic and control channel generation and transmission circuitry 742, configured to generate and transmit downlink user data traffic and control channels within one or more subframes, slots, and/or mini-slots. The DL traffic and control channel generation and transmission circuitry 742 may operate in coordination with the resource assignment and scheduling circuitry 741 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information.

For example, the DL traffic and control channel generation and transmission circuitry 742 may be configured to operate in coordination with the resource assignment and scheduling circuitry 741 to generate a physical downlink control channel (PDCCH) (or Enhanced PDCCH (ePDCCH)) including downlink control information (DCI). In some examples, one or more of the PDCCHs may include grant modification information modifying a previous grant sent in a previous PDCCH, a concurrent PDCCH, or the same PDCCH. The DL traffic and control channel generation and transmission circuitry 742 may further be configured to generate a physical downlink shared channel (PDSCH) (or Enhanced PDSCH (ePDSCH)) including downlink user data traffic. The DL traffic and control channel generation and transmission circuitry 742 may further operate in coordination with DL traffic and control channel generation and transmission software 752.

The processor 704 may further include uplink (UL) traffic and control channel reception and processing circuitry 743, configured to receive and process uplink control channels and uplink traffic channels from one or more scheduled entities. For example, the UL traffic and control channel reception and processing circuitry 743 may be configured to receive uplink user data traffic from one or more scheduled entities. In addition, the UL traffic and control channel reception and processing circuitry 743 may operate in coordination with the resource assignment and scheduling circuitry 741 to schedule UL user data traffic transmissions, DL user data traffic transmissions and/or DL user data traffic retransmissions in accordance with the received UCI. The UL traffic and control channel reception and processing circuitry 743 may further operate in coordination with UL traffic and control channel reception and processing software 753.

Figure 8:
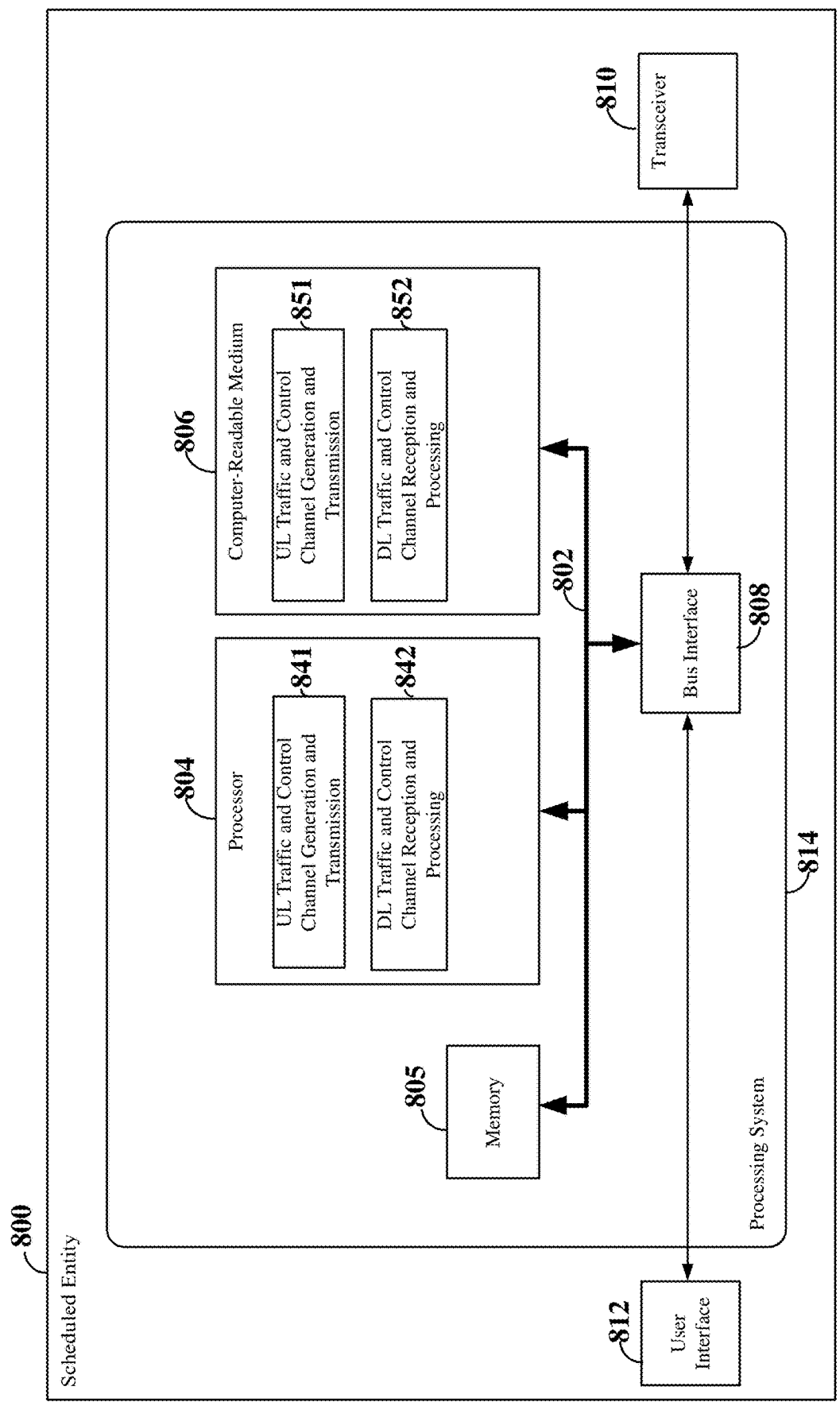
FIG. 8 is a block diagram illustrating an example of a hardware implementation for a scheduled entity employing a processing system according to some aspects of the present disclosure.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1 and 2.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described below.

In some aspects of the disclosure, the processor 804 may include uplink (UL) traffic and control channel generation and transmission circuitry 841, configured to generate and transmit uplink control/feedback/acknowledgement information on an UL control channel (e.g., a PUCCH) or UL traffic channel (e.g., a PUSCH) in accordance with an uplink grant. The UL traffic and control channel generation and transmission circuitry 841 may further be configured to generate and transmit uplink user data traffic on an UL traffic channel (e.g., a PUSCH). The UL traffic and control channel generation and transmission circuitry 841 may operate in coordination with UL traffic and control channel generation and transmission software 851.

The processor 804 may further include downlink (DL) traffic and control channel reception and processing circuitry 842, configured for receiving and processing downlink user data traffic on a traffic channel, and to receive and process control information on one or more downlink control channels. For example, the DL traffic and control channel reception and processing circuitry 842 may be configured to receive grants for downlink transmissions or uplink transmissions within downlink control information (DCI) of a PDCCH.

In various aspects of the present disclosure, the DL traffic and control channel reception and processing circuitry 842 may be configured to receive a grant within a PDCCH and grant modification information modifying the grant within a subsequent PDCCH received in a subsequent slot, a concurrent PDCCH received in the same slot, or the same PDCCH. For example, the grant modification information may indicate that additional resources have been reserved to transmit one or more additional packets (e.g., a different set of time-frequency resources or a different set of MIMO layers within the same slot), a time-frequency resource allocation of the grant has been modified, the waveform utilized for the grant has been modified, the transmit-diversity scheme utilized for the grant has been modified, or specific processing to be utilized for the packet.

In some examples, the grant modification information indicates that additional packet(s) may be simultaneously transmitted or received on different time-frequency resources or on different MIMO layers of the same time-frequency resources within the same slot. The grant modification information may further indicate the MCS to utilize for the additional packet(s), the HARQ process ID to utilize for the additional packet(s), resources allocated for acknowledgement of the additional packet(s), RSV/RV assigned to the additional packet(s), and other pertinent information. The DL traffic and control channel reception and processing circuitry 842 may operate in coordination with DL traffic and control channel reception and processing software 852.

Figure 9:
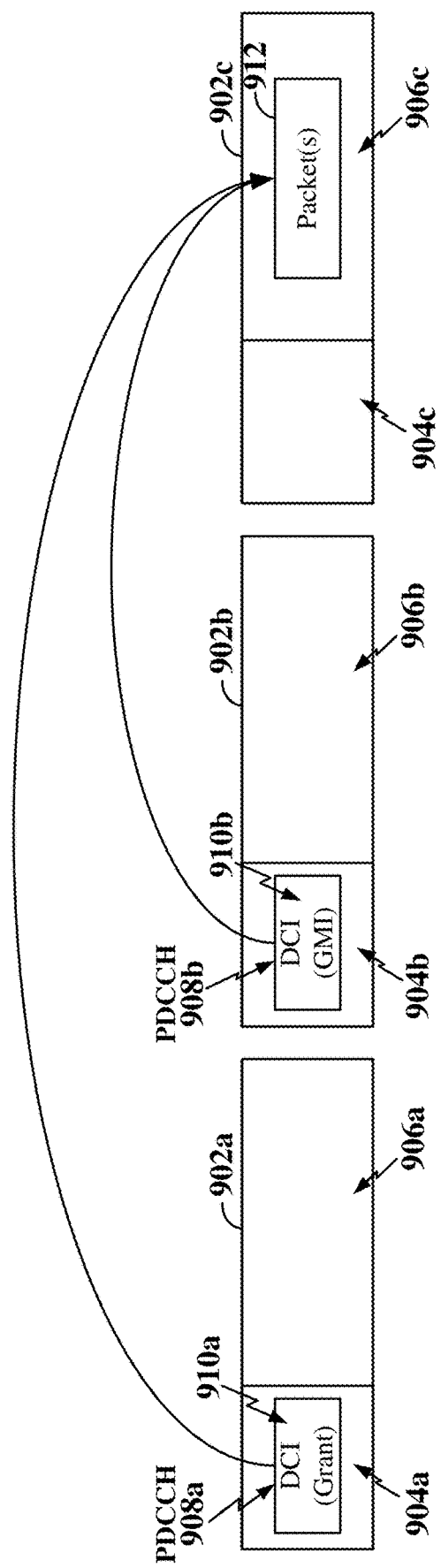
FIG. 9 illustrates an example of scheduling a grant for at least one packet transmitted within a slot utilizing multiple control channels according to some aspects of the present disclosure.

FIG. 9 illustrates an example of scheduling a grant for at least one packet transmitted within a slot utilizing multiple control channels according to some aspects of the present disclosure. In the example shown in FIG. 9, three slots 902a, 902b, and 902c are illustrated, each including a respective control region 904a, 904b, and 904c and a respective traffic region 906a, 906b, 906c. Each of the slots 902a, 902b, and 902c may be, for example, a DL-centric slot or an UL-centric slot. Thus, in some examples, the control regions 904a, 904b, and 904c may correspond to a DL burst 402 of a DL-centric slot 400 shown in FIG. 4 or a DL burst 502 of an UL-centric slot 500 shown in FIG. 5. The traffic regions 906a, 906b, and 906c may correspond, for example, to a DL traffic region 404 of a DL-centric slot 400 shown in FIG. 4 or an UL traffic region 504 of an UL-centric slot shown in FIG. 5. In addition, although not shown, it should be understood that an UL burst corresponding, for example, to the UL burst 406 or 506 shown in FIG. 4 or 5 may further be included at the end of the traffic regions 906a, 906b, and 906c.

A first control channel (PDCCH) 908a carrying first downlink control information (DCI) 910a including a grant (e.g., a downlink assignment or an uplink grant) for a UE (scheduled entity) is shown transmitted in the control region 904a of the first slot 902a. The grant indicates time-frequency resources within the traffic region 906c of the third slot 902c that have been allocated for transmission of a packet 912 (e.g., a PDSCH or PUSCH grant). A second control channel 908b carrying second DCI 910b including grant modification information (GMI) is shown transmitted in the control region 904b of the second slot 902b. The GMI indicates modifications made to one or more properties of the grant transmitted in the first DCI 910a. For example, the GMI may indicate that additional resources have been reserved to transmit one or more additional packets (not shown) within the third slot 902c, a time-frequency resource allocation for the packet 912 in the third slot 902c has been modified, the waveform utilized for the packet 912 has been modified, the transmit-diversity scheme utilized for the packet 912 has been modified, or specific processing to be utilized for the packet 912.

Figure 10:
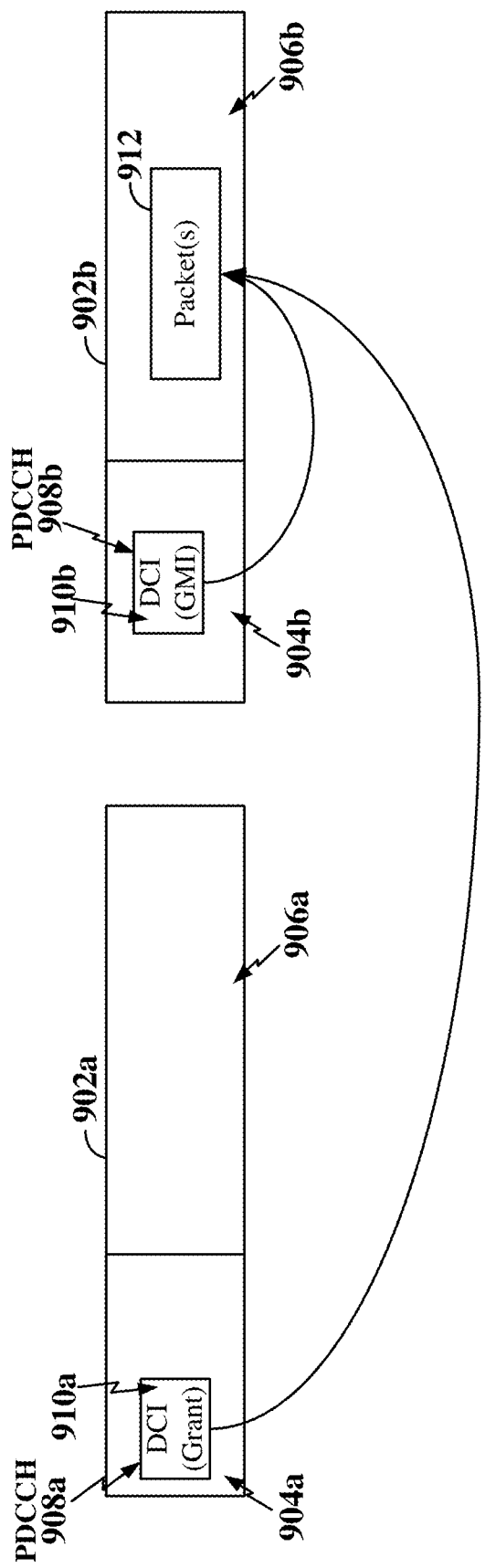
FIG. 10 illustrates another example of scheduling a grant for at least one packet transmitted within a slot utilizing multiple control channels according to some aspects of the present disclosure.

FIG. 10 illustrates another example of scheduling a grant for at least one packet transmitted within a slot utilizing multiple control channels according to some aspects of the present disclosure. In the example shown in FIG. 10, two slots 902a and 902b are illustrated, each including a respective control region 904a and 904b and a respective traffic region 906a and 906b.

A first control channel (PDCCH) 908a carrying first downlink control information (DCI) 910a including a grant (e.g., a downlink assignment or an uplink grant) for a UE (scheduled entity) is shown transmitted in the control region 904a of the first slot 902a. The grant indicates time-frequency resources within the traffic region 906b of the second slot 902b that have been allocated for transmission of a packet 912 (e.g., a PDSCH or PUSCH grant). A second control channel 908b carrying second DCI 910b including grant modification information (GMI) is shown transmitted in the control region 904b of the second slot 902b. The GMI indicates modifications made to one or more properties of the grant transmitted in the first DCI 910a.

Figure 11:
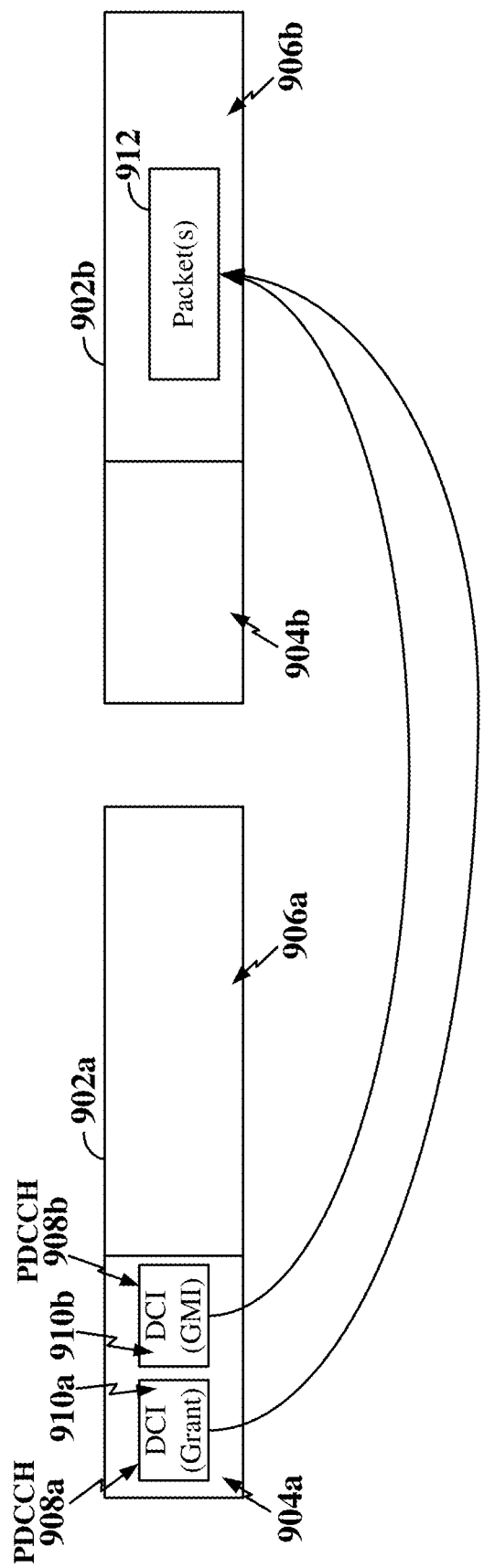
FIG. 11 illustrates another example of scheduling a grant for at least one packet transmitted within a slot utilizing multiple control channels according to some aspects of the present disclosure.

FIG. 11 illustrates another example of scheduling a grant for at least one packet transmitted within a slot utilizing multiple control channels according to some aspects of the present disclosure. In the example shown in FIG. 11, two slots 902a and 902b are illustrated, each including a respective control region 904a and 904b and a respective traffic region 906a and 906b.

A first control channel (PDCCH) 908a carrying first downlink control information (DCI) 910a including a grant (e.g., a downlink assignment or an uplink grant) for a UE (scheduled entity) is shown transmitted in the control region 904a of the first slot 902a. The grant indicates time-frequency resources within the traffic region 906b of the second slot 902b that have been allocated for transmission of a packet 912 (e.g., a PDSCH or PUSCH grant). A second control channel 908b carrying second DCI 910b including grant modification information (GMI) is shown also transmitted in the control region 904a of the first slot 902a. The GMI indicates modifications made to one or more properties of the grant transmitted in the first DCI 910a.

In this example, the second PDCCH 908b may be transmitted on one or more subsequent OFDM symbols in the control region 904a or the slot 902a. For example, the first PDCCH 908a may be transmitted in a first OFDM symbol of the slot 902a, while the second PDCCH 908b may be transmitted in a second or other subsequent OFDM symbol of the slot 902a.

Figure 12:
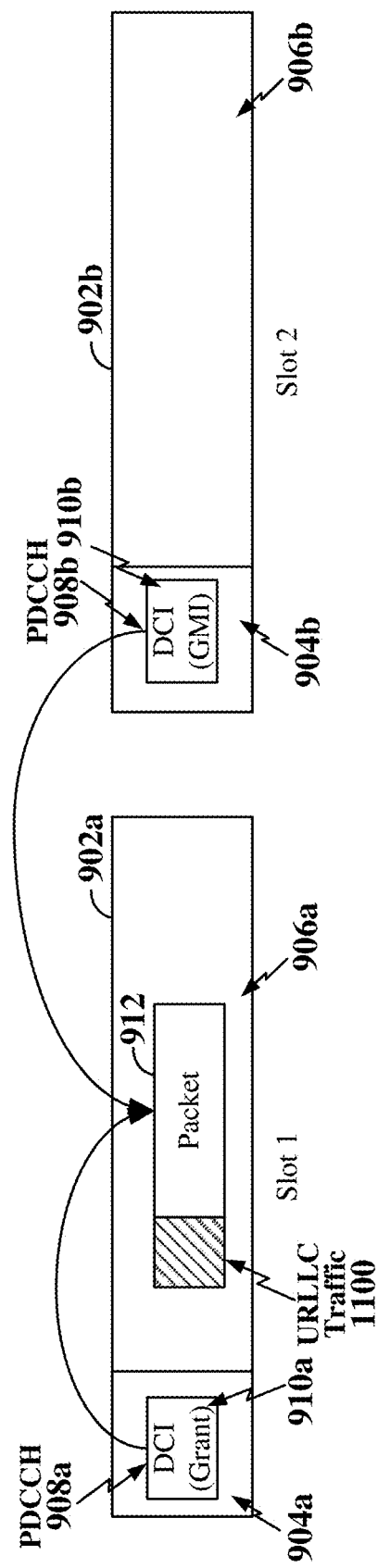
FIG. 12 illustrates another example of scheduling a grant for at least one packet transmitted within a slot utilizing multiple control channels according to some aspects of the present disclosure.

FIG. 12 illustrates another example of scheduling a grant for at least one packet transmitted within a slot utilizing multiple control channels according to some aspects of the present disclosure. In the example shown in FIG. 12, two slots 902a and 902b are illustrated, each including a respective control region 904a and 904b and a respective traffic region 906a and 906b.

A first control channel (PDCCH) 908a carrying first downlink control information (DCI) 910a including a grant (e.g., a downlink assignment or an uplink grant) for a UE (scheduled entity) is shown transmitted in the control region 904a of the first slot 902a. The grant indicates time-frequency resources within the traffic region 906a of the first slot 902a that have been allocated for transmission of a packet 912 (e.g., a PDSCH or PUSCH grant).

In the example shown in FIG. 12, a portion of the packet 912 was punctured to accommodate low latency traffic (e.g., URLLC traffic) 1100. Therefore, a second control channel 908b carrying second DCI 910b including grant modification information (GMI) may be transmitted in the control region 904b of the second slot 902b after transmission of the packet 912 in the first slot 902a. The GMI may include puncturing information that indicates the resources punctured and any special processing to be utilized for the punctured packet.

Although not shown, it should be understood that in other examples, the GMI may be transmitted prior to transmission of the packet. In this case, the GMI may modify the start and/or end of the grant (e.g., starting OFDM symbol and/or ending OFDM symbol) or the transmit bandwidth (e.g., number of resource blocks) to accommodate the puncturing. In some examples, the MCS may not change, and the transport block size computation may automatically adapt to the revised number of resource elements (REs) in the grant.

Figure 13:
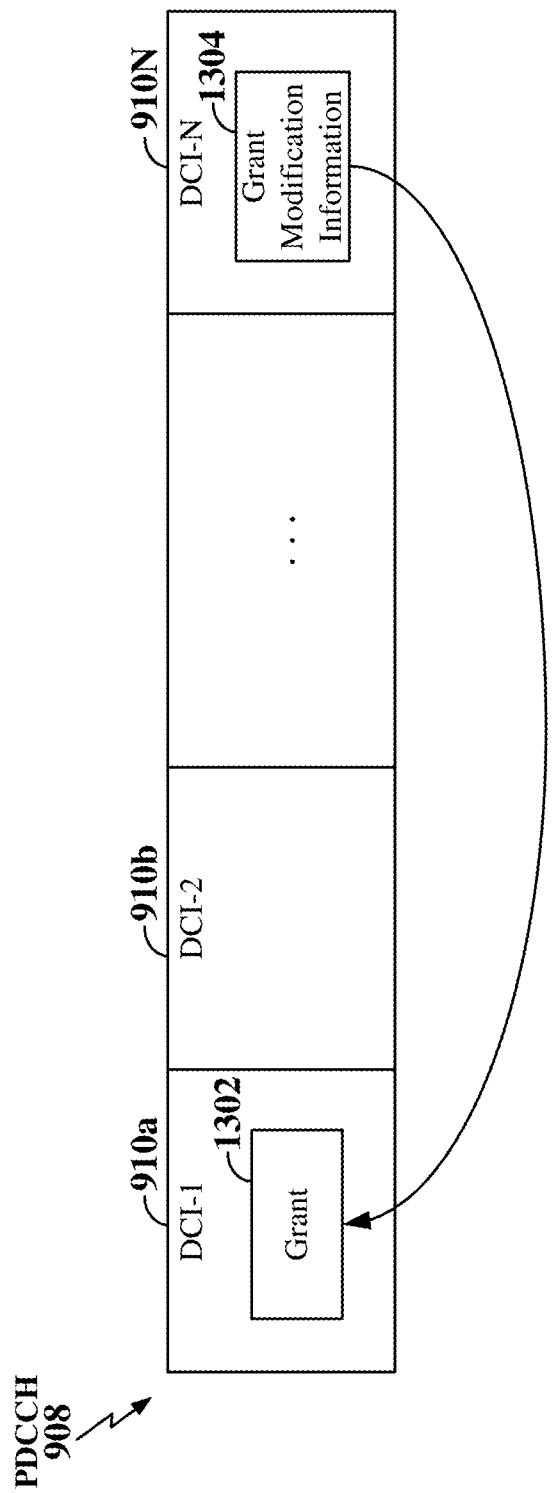
FIG. 13 illustrates another example of scheduling of a grant for at least one packet within a single control channel utilizing multiple control information according to some aspects of the present disclosure.

FIG. 13 illustrates another example of scheduling of a grant for at least one packet within a single control channel utilizing multiple control information according to some aspects of the present disclosure. In the example shown in FIG. 13, a single control channel (PDCCH) 908 includes multiple DCI 910a, 910b, . . . , 910N, denoted DCI-1, DCI-2, . . . DCI-N. Each DCI 910a, 910b, . . . 910N may contain a separate grant for the scheduled entity (e.g., a dynamic grant, semi-persistently scheduled grant, and/or other types of grants) and/or one or more of the DCI 910a, 910b, . . . 910N may include grant modification information (GMI) modifying a previous grant.

In the example shown in FIG. 13, DCI-1 910a includes a grant 1302, and DCI-N 910N includes GMI 1304 that modifies the grant 1302 included in DCI-1 910a. The GMI 1304 may modify one or more properties of the grant 1302, such as the number of packets associated with the grant 1302, the time-frequency resources allocated for the grant 1302, the waveform utilized for the grant 1302, the transmit-diversity scheme utilized for the grant 1302, or specific processing to be utilized for the grant 1302. In some examples, instead of modifying the grant 1302 included in DCI-1 910a, the GMI 1304 may modify another grant included within the same PDCCH 908 or another PDCCH.

Figure 14:
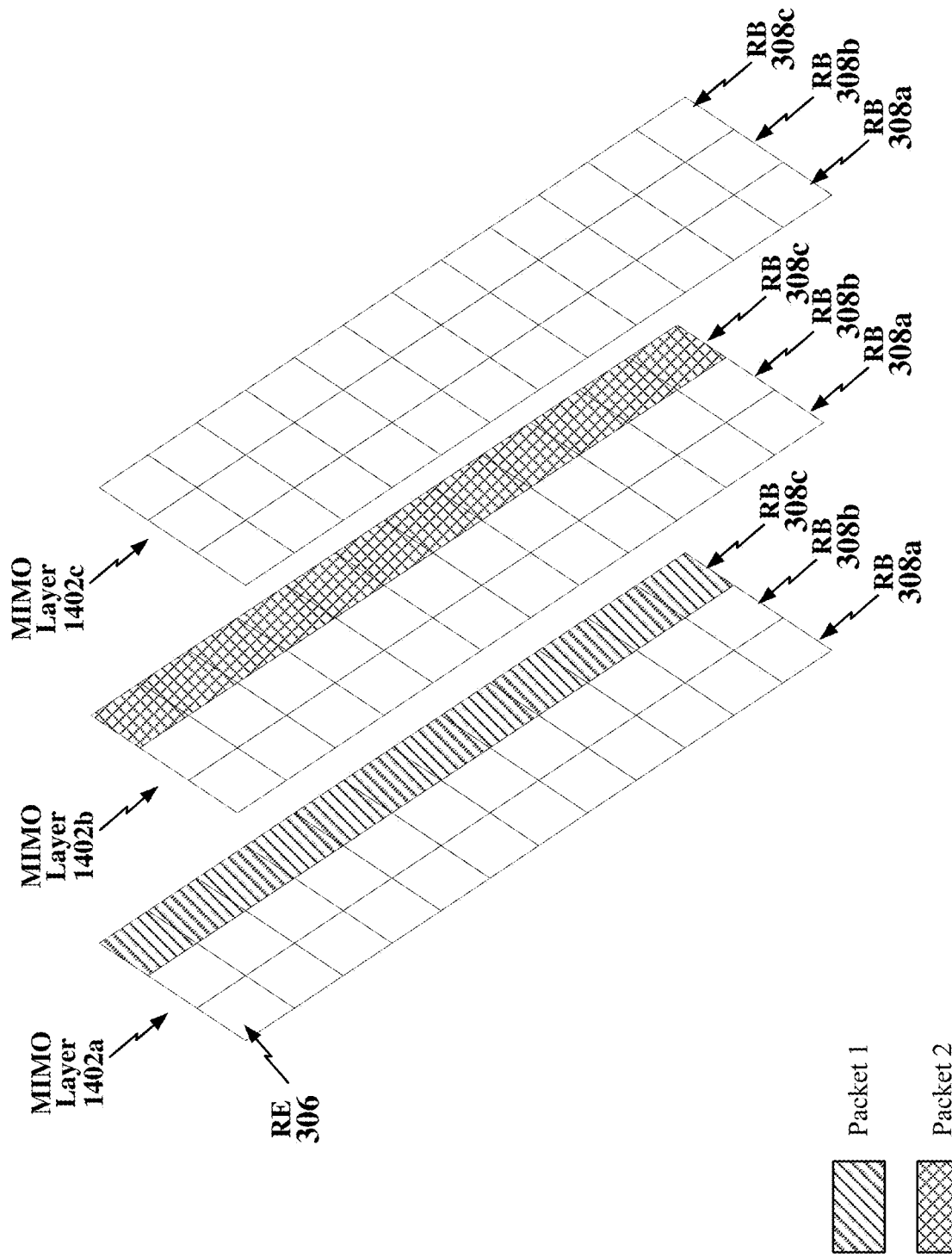
FIG. 14 illustrates an example of scheduling multiple packets for transmission in a slot utilizing different MIMO layers according to some aspects of the disclosure.

FIG. 14 illustrates an example of scheduling multiple packets for transmission in a slot utilizing different MIMO layers according to some aspects of the disclosure. In the example shown in FIG. 14, a portion of a bandwidth is spatially illustrated across multiple MIMO layers. For simplicity, only three MIMO layers 1402a, 1402b, and 1402c are shown in FIG. 14. The illustrated bandwidth portion may correspond to, for example, a portion of a system bandwidth utilized by a radio access network (e.g., a base station to communicate with one or more UEs) or a portion of a device bandwidth utilized by a particular UE (which may be less than the total system bandwidth available). In some examples, the illustrated bandwidth portion may correspond to a portion of the resource grid 304 shown in FIG. 3. In the example shown in FIG. 14, the illustrated bandwidth portion includes three resource blocks (RBs) 308a, 308b, and 308c, each including twelve respective resource elements (REs) 306 in the time-frequency domain.

In some examples, each MIMO layer 1402a, 1402b, and 1402c may be associated with a respective transmit antenna at the transmitter and may be utilized to transmit a spatially precoded stream (e.g., a spatially precoded packet or portion of a packet) via the respective transmit antenna to a receiver. In the example shown in FIG. 14, a first packet, denoted Packet 1, may be transmitted on a first MIMO layer 1402a to a scheduled entity (UE), while a second packet, denoted Packet 2, may be transmitted on a second MIMO layer 1402b to the same UE. In addition, each packet may be allocated the same time-frequency resources within the system or device bandwidth. In the example shown in FIG. 14, each packet may be allocated the same RB 308c.

Figure 15:
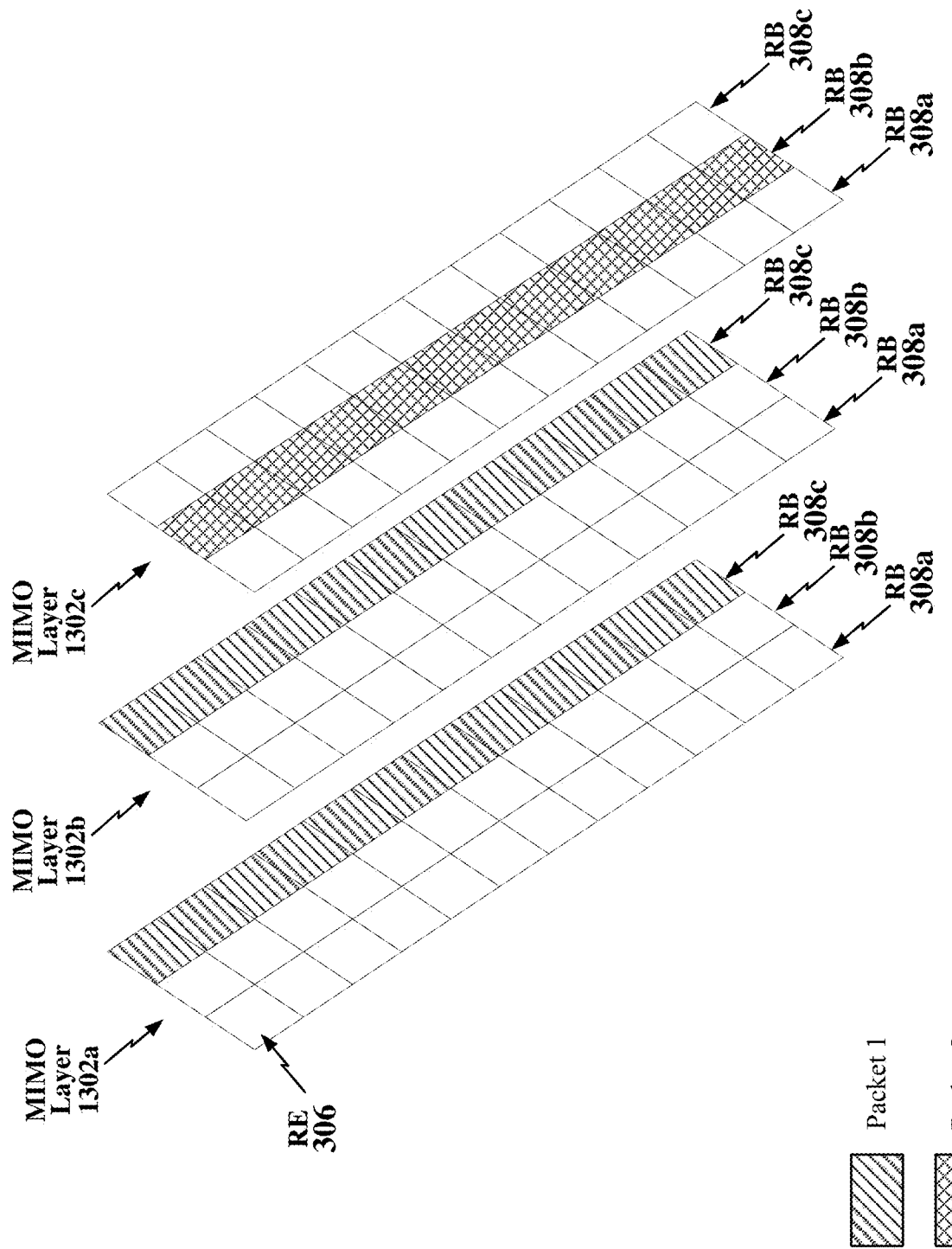
FIG. 15 illustrates another example of scheduling multiple packets for transmission in a slot utilizing different MIMO layers according to some aspects of the disclosure.

FIG. 15 illustrates another example of scheduling multiple packets for transmission in a slot utilizing different MIMO layers according to some aspects of the disclosure. In some examples, a high rate packet may be split into multiple lower-rate streams, each transmitted from a different antenna (on a different MIMO layer). In the example shown in FIG. 15, the first packet (Packet 1) may be split into two streams and transmitted on the same time-frequency resources (e.g., RB 308c) on a set of two MIMO layers 1402a and 1402b. In addition, the second packet (Packet 2) may be transmitted on a third MIMO layer 1402c on the same or different time-frequency resources. In the example shown in FIG. 15, the second packet is transmitted on a different RB (RB 308b) than the first packet.

Figure 16:
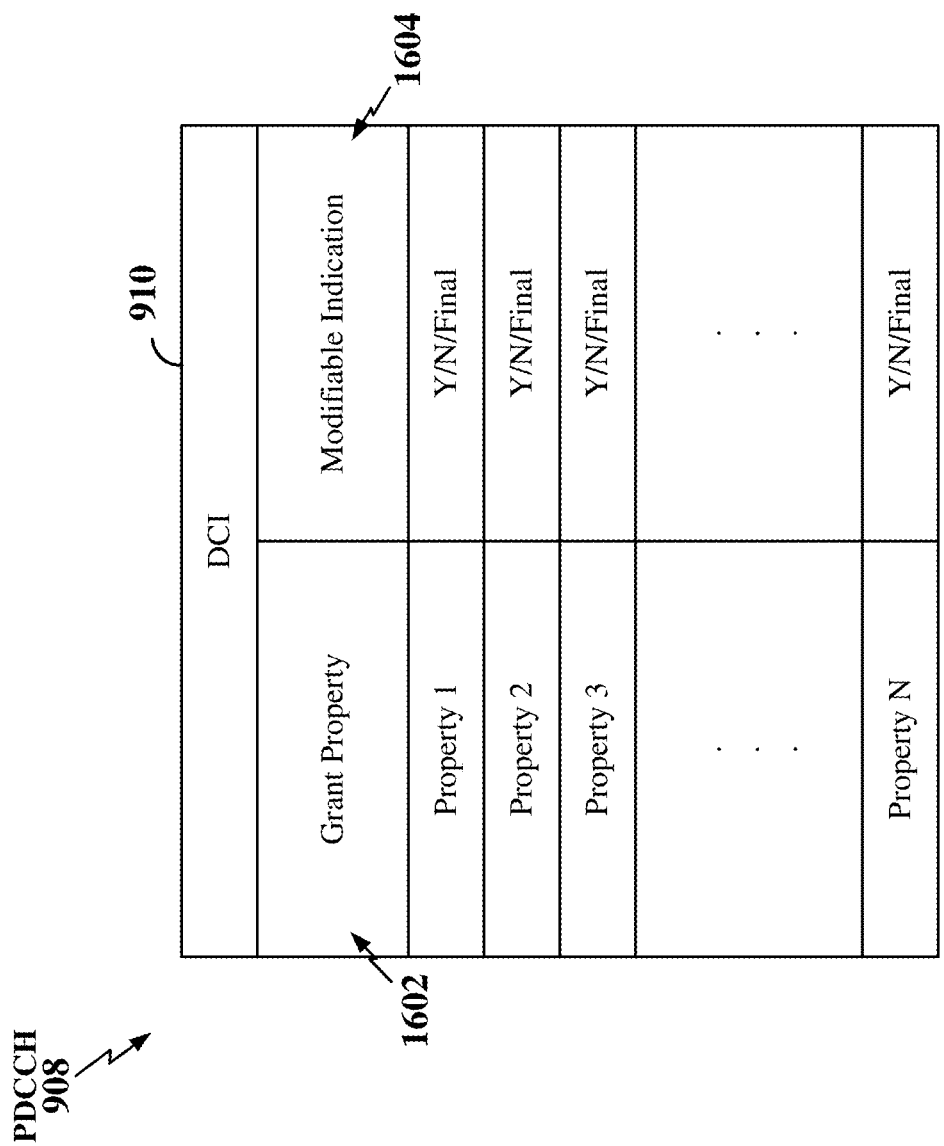
FIG. 16 illustrates an example of downlink control information including a grant having modifiable grant properties according to some aspects of the present disclosure.

FIG. 16 illustrates an example of downlink control information including a grant having modifiable grant properties according to some aspects of the present disclosure. The grant is illustrated as being transmitted within DCI 910 of a PDCCH 908. The DCI 910 may include, for example, a plurality of grant properties 1602 of the grant, along with a modifiable indication 1604 for each of the grant properties 1602. Each modifiable indication 1604 may include, for example, one or more bits that may inform the scheduled entity that the property 1602 may be further modified ("Y") in a concurrent or subsequent PDCCH (or DCI within the same PDCCH), may not be modified ("N") (e.g., is unmodifiable) in a concurrent or subsequent PDCCH (or DCI within the same PDCCH), or will not be further modified ("Final") in a concurrent or subsequent PDCCH (or DCI within the same PDCCH). In some examples, a final PDCCH (or DCI within the same PDCCH) for a set of resource elements within a slot may include the "Final" indicator when the PDCCH (or DCI within the same PDCCH) is a final PDCCH.

In some examples, to reduce the PDCCH overhead, a second DCI/PDCCH that modifies a first DCI/PDCCH may not include any unmodifiable information (e.g., any information that may not change from the first to the second DCI/PDCCH). In other examples, the second DCI/PDCCH may set the unmodifiable information to the same as the first DCI/PDCCH. If the unmodifiable information is set to the same as the first DCI/PDCCH at the PDCCH transmitter, and the PDCCH receiver at the scheduled entity determines that this information is not the same in the first and the second DCI/PDCCH, the scheduled entity may ignore both the first and second DCI/PDCCHs.

Figure 17:
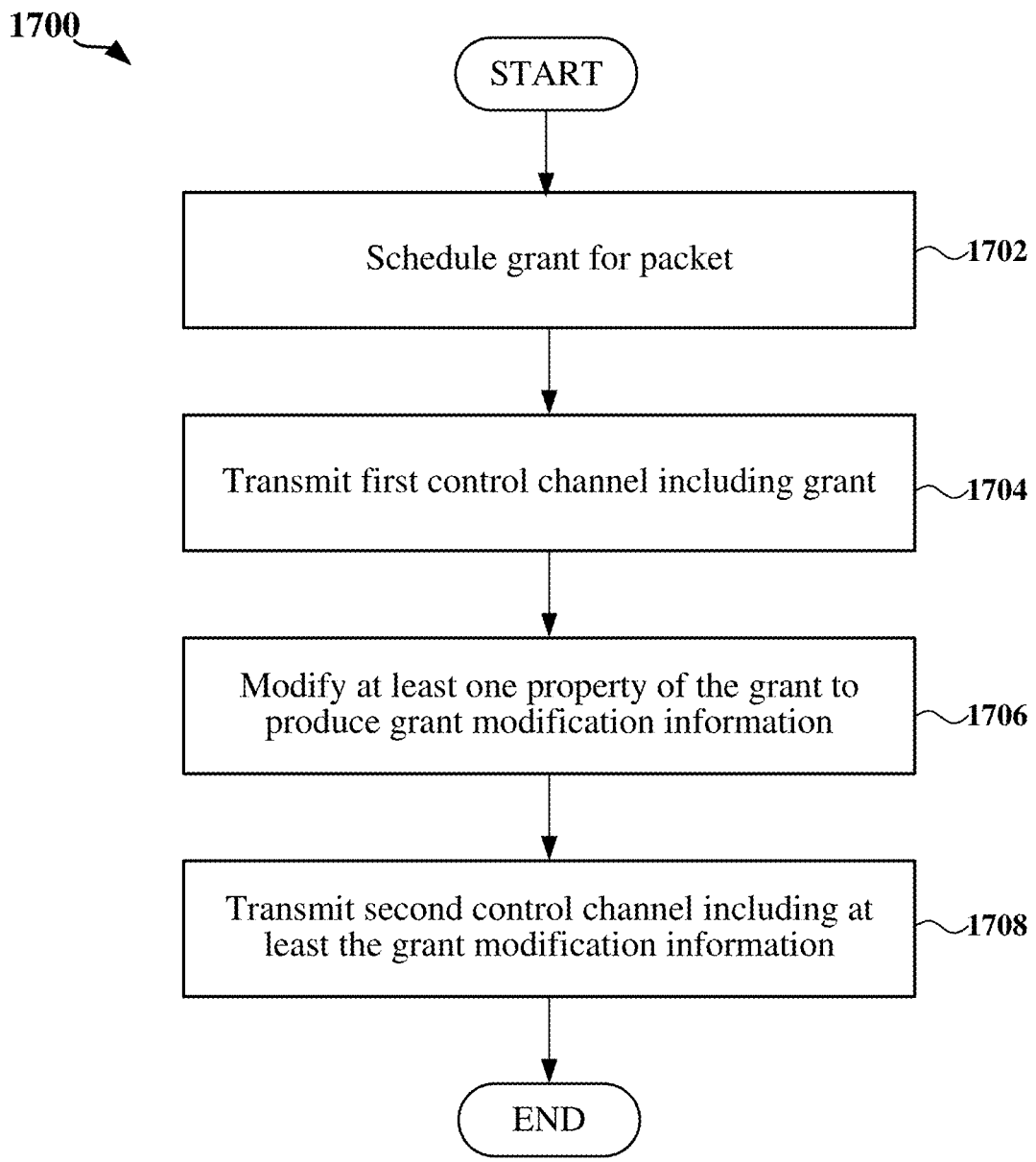
FIG. 17 is a flow chart illustrating an exemplary process for scheduling a grant utilizing multiple control signals according to some aspects of the present disclosure.

FIG. 17 is a flow chart illustrating an exemplary process 1700 for scheduling a grant utilizing multiple control signals in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 700 illustrated in FIG. 7. In some examples, the process 1700 may be carried out by any suitable apparatus or means for carrying out the functions or algorithm described below.

At block 1702, the scheduling entity may schedule a grant for a packet for a scheduled entity. For example, the resource assignment and scheduling circuitry 741 shown and described in reference to FIG. 7 above may schedule the grant for the packet. At block 1704, the scheduling entity may transmit a first control channel (e.g., a PDCCH) including first control information (e.g., DCI) that includes the grant for the packet to the scheduled entity. For example, the resource assignment and scheduling circuitry 741, DL traffic and control channel generation and transmission circuitry 742 and transceiver 710 shown and described in reference to FIG. 7 above may generate and transmit the first control channel to the scheduled entity.

At block 1706, the scheduling entity may modify at least one property of the grant to produce grant modification information. For example, the scheduling entity may add a packet to the grant for transmission on different time-frequency resources or a different set of one or more MIMO layers, modify a RB allocation of the grant, modify the waveform utilized for the grant, or modify the transmit-diversity scheme utilized for the grant. For example, the resource assignment and scheduling circuitry 741 shown and described in reference to FIG. 7 above may modify at least one property of the grant.

At block 1708, the scheduling entity may transmit a second control channel (e.g., PDCCH) including second control information (e.g., DCI) that includes at least the grant modification information to the scheduled entity. In some examples, the second control information (DCI) may be transmitted within the same PDCCH as the first control information. In some examples, the first and second control channels may be separately transmitted within the same slot or different slots. In some examples, the second control information may also include the unmodified properties of the grant. For example, the resource assignment and scheduling circuitry 741, DL traffic and control channel generation and transmission circuitry 742 and transceiver 710 shown and described in reference to FIG. 7 above may transmit the second control channel to the scheduled entity.

Figure 18:
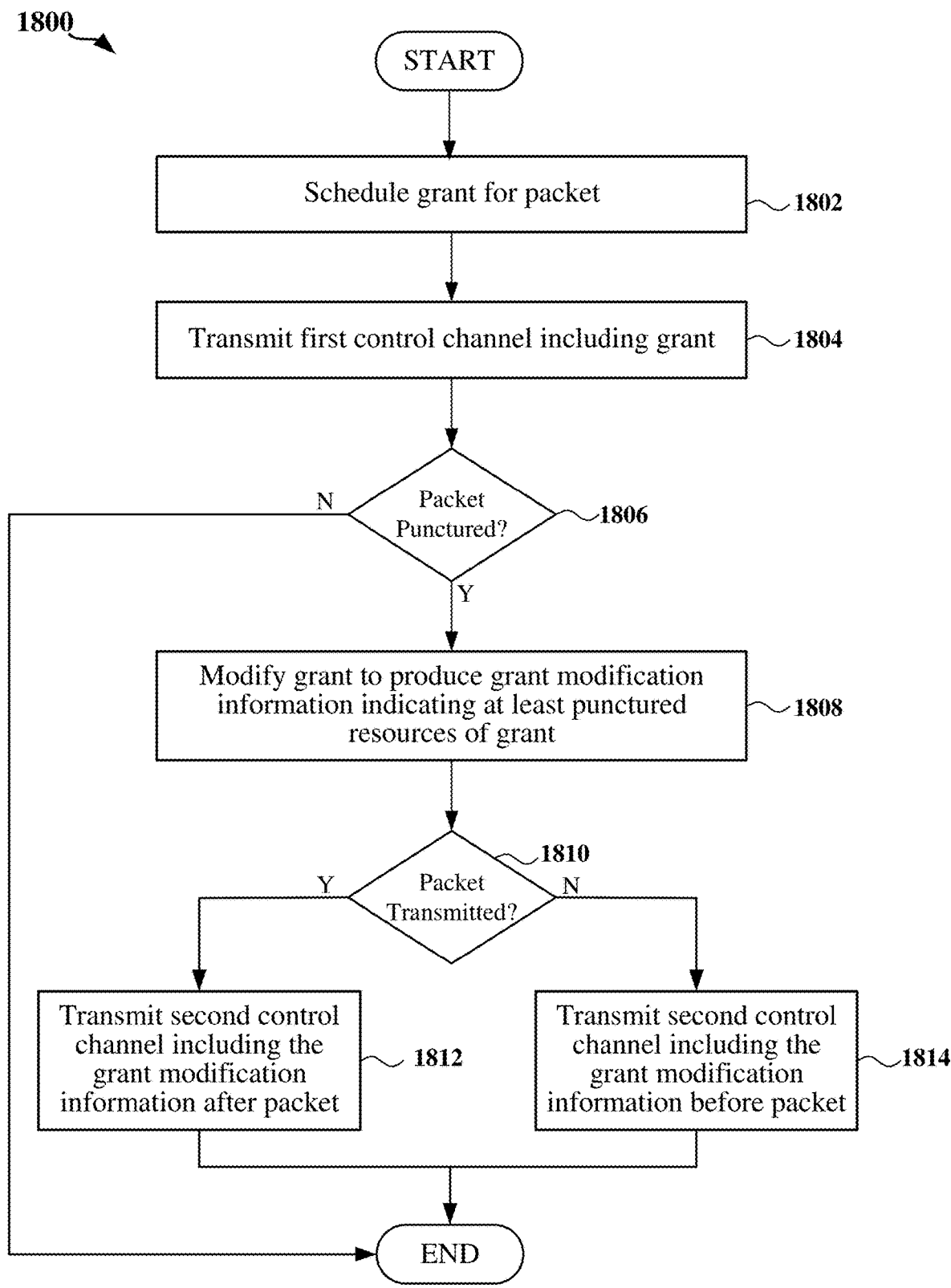
FIG. 18 is a flow chart illustrating another exemplary process for scheduling a grant utilizing multiple control signals according to some aspects of the present disclosure.

FIG. 18 is a flow chart illustrating an exemplary process 1800 for scheduling a grant utilizing multiple control signals in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduling entity 700 illustrated in FIG. 7. In some examples, the process 1800 may be carried out by any suitable apparatus or means for carrying out the functions or algorithm described below.

At block 1802, the scheduling entity may schedule a grant for a first packet for a scheduled entity. For example, the resource assignment and scheduling circuitry 741 shown and described in reference to FIG. 7 above may schedule the grant for the first packet. At block 1804, the scheduling entity may transmit a first control channel (e.g., a PDCCH) including first control information (e.g., DCI) that includes the grant for the first packet to the scheduled entity. For example, the resource assignment and scheduling circuitry 741, DL traffic and control channel generation and transmission circuitry 742 and transceiver 710 shown and described in reference to FIG. 7 above may generate and transmit the first control channel to the scheduled entity.

At block 1806, the scheduling entity may determine whether at least part of the first packet will be punctured. In some examples, the first packet may be punctured to support transmission of a second packet containing low latency traffic for the same scheduled entity or another scheduled entity (e.g., to accommodate a URLLC packet for the same or a different scheduled entity). In other examples, the second packet may contain other types of DL or UL control and/or user data traffic. For example, the resource assignment and scheduling circuitry 741 shown and described in reference to FIG. 7 above may determine whether the packet will be punctured.

If at least part of the first packet will be punctured (Y branch of block 1806), at block 1808, the scheduling entity may modify the grant to produce grant modification information indicating at least the punctured resources of the grant. In some examples, the grant modification information may include punctured resource information indicating the resource elements (REs) allocated to the grant that need to be punctured to support transmission of the second packet. In some examples, the grant modification information may further include processing to be applied to the first packet as a result of the puncturing. For example, any special processing may be included in grant modification information transmitted after transmission of the first packet. For example, the resource assignment and scheduling circuitry 741 shown and described in reference to FIG. 7 above may modify the grant.

At block 1810, the scheduling entity may determine whether the first packet has already been transmitted. For example, the resource assignment and scheduling circuitry 741 shown and described in reference to FIG. 7 above may determine whether the first packet has been transmitted. If the packet has been transmitted (Y branch of block 1810), at block 1812, the scheduling entity may transmit a second control channel (e.g., PDCCH) including second control information (e.g., DCI) that includes at least the grant modification information to the scheduled entity in a slot that occurs later in time that the slot containing the first packet. If the first packet has not already been transmitted (N branch of block 1810), at block 1814, the scheduling entity may transmit a second control channel (e.g., PDCCH) including second control information (e.g., DCI) that includes at least the grant modification information to the scheduled entity in a slot that is prior to or the same as the slot containing the first packet. For example, the resource assignment and scheduling circuitry 741, DL traffic and control channel generation and transmission circuitry 742 and transceiver 710 shown and described above in reference to FIG. 7 may transmit the second control channel to the scheduled entity.

Figure 19:
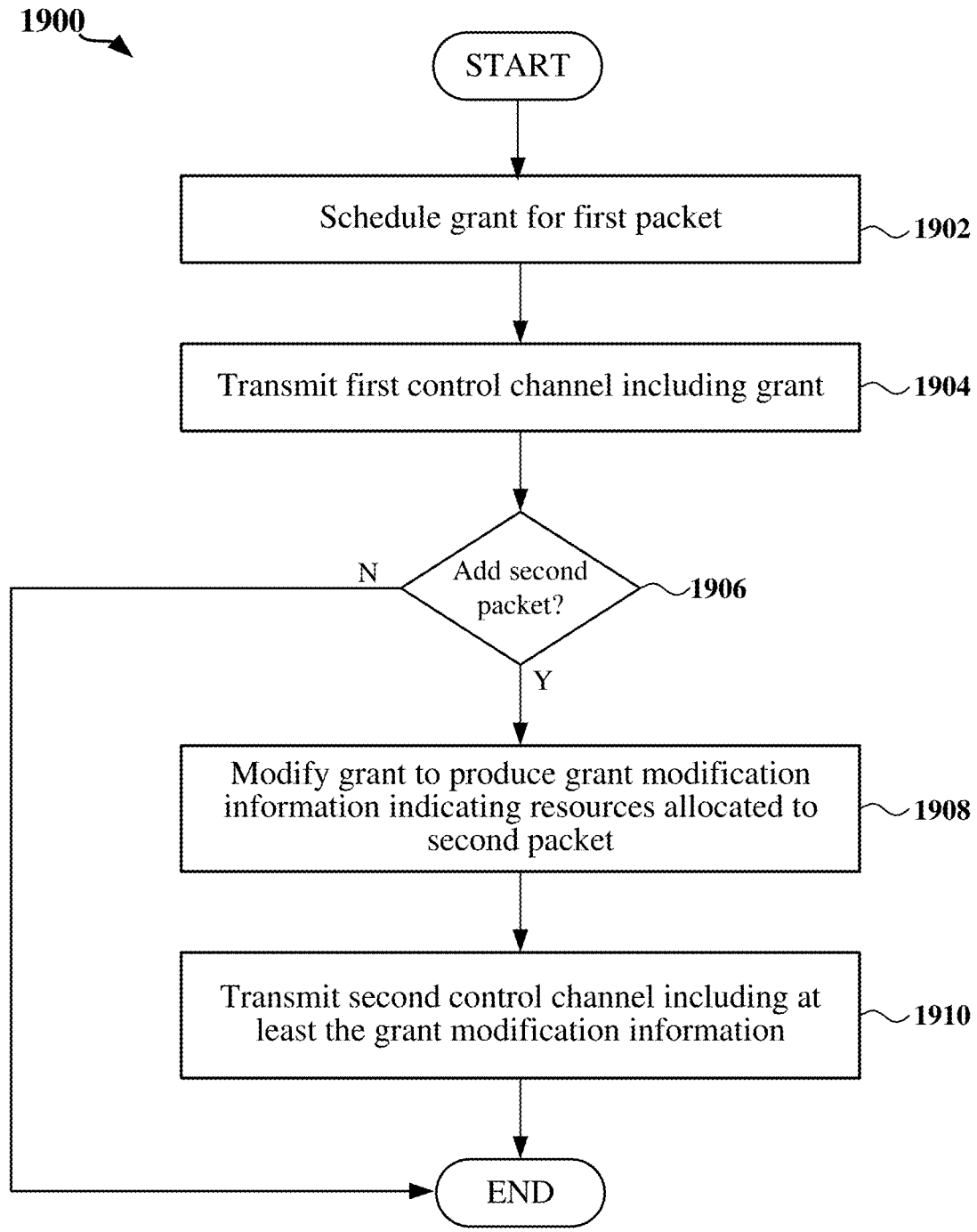
FIG. 19 is a flow chart illustrating another exemplary process for scheduling a grant utilizing multiple control signals according to some aspects of the present disclosure.

FIG. 19 is a flow chart illustrating an exemplary process 1900 for scheduling a grant utilizing multiple control signals in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduling entity 700 illustrated in FIG. 7. In some examples, the process 1900 may be carried out by any suitable apparatus or means for carrying out the functions or algorithm described below.

At block 1902, the scheduling entity may schedule a grant for a first packet for a scheduled entity. For example, the resource assignment and scheduling circuitry 741 shown and described in reference to FIG. 7 above may schedule the grant for the packet. At block 1904, the scheduling entity may transmit a first control channel (e.g., a PDCCH) including first control information (e.g., DCI) that includes the grant for the first packet to the scheduled entity. For example, the resource assignment and scheduling circuitry 741, DL traffic and control channel generation and transmission circuitry 742 and transceiver 710 shown and described in reference to FIG. 7 above may generate and transmit the first control channel to the scheduled entity.

At block 1906, the scheduling entity may determine whether to add a second packet to the grant. In some examples, the scheduling entity may determine that the channel between the scheduling entity and the scheduled entity can support one or more additional MIMO layers (e.g., based on an updated CQI or SRS received from the scheduled entity) or may determine that an additional urgent packet (e.g., an Ultra Reliable Low Latency Communication (URLLC) packet) may need to be transmitted to the scheduled entity, and therefore, may determine that the second packet should be added to the grant. For example, the resource assignment and scheduling circuitry 741 shown and described in reference to FIG. 7 above may determine whether to add a second packet to the grant.

If the scheduling entity determines that a second packet should be added to the grant (Y branch of block 1906), at block 1908, the scheduling entity may modify the grant to produce grant modification information indicating at least resources (e.g., time-frequency resources) allocated to the second packet. For example, the first packet may be scheduled on a first set of resource elements and the second packet may be scheduled on a second set of resource elements. In some examples, the first and second sets of resource elements are the same or at least partially overlap (e.g., the packets are scheduled on the same set or overlapping sets of resource elements). In other examples, the first and second sets of resource elements are different. In examples in which the packets are scheduled on the same (or overlapping) sets of resource elements, each packet may be scheduled on a different set of one or more MIMO layers. For example, the first packet may be scheduled on a first set of one or more MIMO layers and the second packet may be scheduled on a second set of one or more MIMO layers, where each set of MIMO layers is different (non-overlapping). For example, the resource assignment and scheduling circuitry 741 shown and described in reference to FIG. 7 above may modify the grant.

At block 1910, the scheduling entity may transmit a second control channel (e.g., PDCCH) including second control information (e.g., DCI) that includes at least the grant modification information to the scheduled entity. In some examples, the second control information (DCI) may be transmitted within the same PDCCH as the first control information. In some examples, the first and second control channels may be separately transmitted within the same slot or different slots. In some examples, the second control information may also include the unmodified properties of the grant. For example, the resource assignment and scheduling circuitry 741, DL traffic and control channel generation and transmission circuitry 742 and transceiver 710 shown and described in reference to FIG. 7 above may transmit the second control channel to the scheduled entity.

Figure 20:
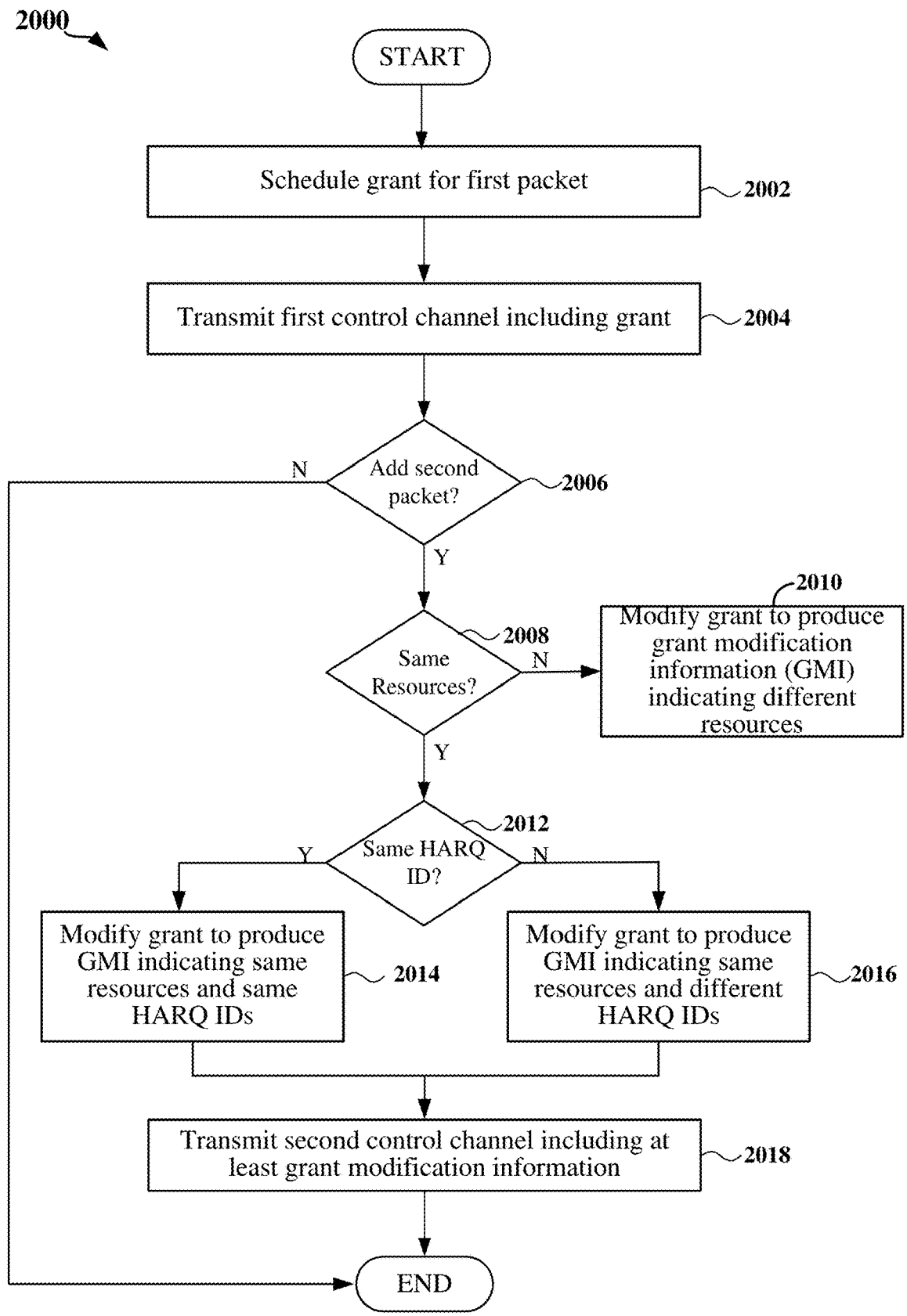
FIG. 20 is a flow chart illustrating another exemplary process for scheduling a grant utilizing multiple control signals according to some aspects of the present disclosure.

FIG. 20 is a flow chart illustrating an exemplary process 2000 for scheduling a grant utilizing multiple control signals in accordance with some aspects of the present disclosure. As described below, some or all illustrated features may be omitted in a particular implementation within the scope of the present disclosure, and some illustrated features may not be required for implementation of all embodiments. In some examples, the process 2000 may be carried out by the scheduling entity 700 illustrated in FIG. 7. In some examples, the process 2000 may be carried out by any suitable apparatus or means for carrying out the functions or algorithm described below.

At block 2002, the scheduling entity may schedule a grant for a first packet for a scheduled entity. For example, the resource assignment and scheduling circuitry 741 shown and described in reference to FIG. 7 above may schedule the grant for the packet. At block 2004, the scheduling entity may transmit a first control channel (e.g., a PDCCH) including first control information (e.g., DCI) that includes the grant for the first packet to the scheduled entity. For example, the resource assignment and scheduling circuitry 741, DL traffic and control channel generation and transmission circuitry 742 and transceiver 710 shown and described in reference to FIG. 7 above may generate and transmit the first control channel to the scheduled entity.

At block 2006, the scheduling entity may determine whether to add a second packet to the grant. In some examples, the scheduling entity may determine that the channel between the scheduling entity and the scheduled entity can support one or more additional MIMO layers (e.g., based on an updated CQI or SRS received from the scheduled entity) or may determine that an additional urgent packet (e.g., an Ultra Reliable Low Latency Communication (URLLC) packet) may need to be transmitted to the scheduled entity, and therefore, may determine that the second packet should be added to the grant. For example, the resource assignment and scheduling circuitry 741 shown and described in reference to FIG. 7 above may determine whether to add a second packet to the grant.

If the scheduling entity determines that a second packet should be added to the grant (Y branch of block 2006), at block 2008, the scheduling entity may determine whether to transmit the second packet on the same resources (e.g., time-frequency resources) as the first packet. For example, the scheduling entity may determine whether the channel between the scheduling entity and scheduled entity can support one or more additional MIMO layers on the same (or overlapping) sets of resource elements to transmit the second packet. For example, the resource assignment and scheduling circuitry 741 shown and described in reference to FIG. 7 above may determine whether to utilize the same resources for the first and second packets.

If the scheduling entity determines that different resources should be utilized for the first and second packets (N branch of block 2008), at block 2010, the scheduling entity may modify the grant to produce grant modification information indicating at least the different resources (e.g., time-frequency resources) allocated to the second packet. For example, the first packet may be scheduled on a first set of resource elements and the second packet may be scheduled on a second set of resource elements that is different than the first set of resource elements. For example, the resource assignment and scheduling circuitry 741 shown and described in reference to FIG. 7 above may modify the grant.

If the scheduling entity determines that the same (or overlapping) resources are to be utilized for the first and second packets, where each packet is transmitted on a different set of one or more MIMO layers (Y branch of block 2008), at block 2012, the scheduling entity may determine whether the second packet should be assigned the same HARQ process ID as the first packet. In some examples, different HARQ process IDs may be used for each of the packets when the initial grant and the grant modification information are transmitted within different PDCCH. For example, the resource assignment and scheduling circuitry 741 shown and described in reference to FIG. 7 above may determine whether the same HARQ process ID should be utilized for both packets.

If the scheduling entity determines that the same HARQ process ID should be assigned to each packet (Y branch of block 2012), at block 2014, the scheduling entity may modify the grant to produce grant modification information indicating at least that the second packet is allocated the same resources (e.g., time-frequency resources) as the first packet on a different set of one or more MIMO layers and that the second packet is assigned the same HARQ process ID. For example, the resource assignment and scheduling circuitry 741 shown and described in reference to FIG. 7 above may modify the grant.

If the scheduling entity determines that different HARQ process IDs should be assigned to each packet (N branch of block 2012), at block 2016, the scheduling entity may modify the grant to produce grant modification information indicating at least that the second packet is allocated the same resources (e.g., time-frequency resources) as the first packet on a different set of one or more MIMO layers and that the second packet is assigned a different HARQ process ID. For example, the resource assignment and scheduling circuitry 741 shown and described in reference to FIG. 7 above may modify the grant.

At block 2018, the scheduling entity may transmit a second control channel (e.g., PDCCH) including second control information (e.g., DCI) that includes at least the grant modification information to the scheduled entity. In some examples, the second control information (DCI) may be transmitted within the same PDCCH as the first control information. In some examples, the first and second control channels may be separately transmitted within the same slot or different slots. In some examples, the second control information may also include the unmodified properties of the grant. For example, the resource assignment and scheduling circuitry 741, DL traffic and control channel generation and transmission circuitry 742 and transceiver 710 shown and described in reference to FIG. 7 above may transmit the second control channel to the scheduled entity.

Figure 21:
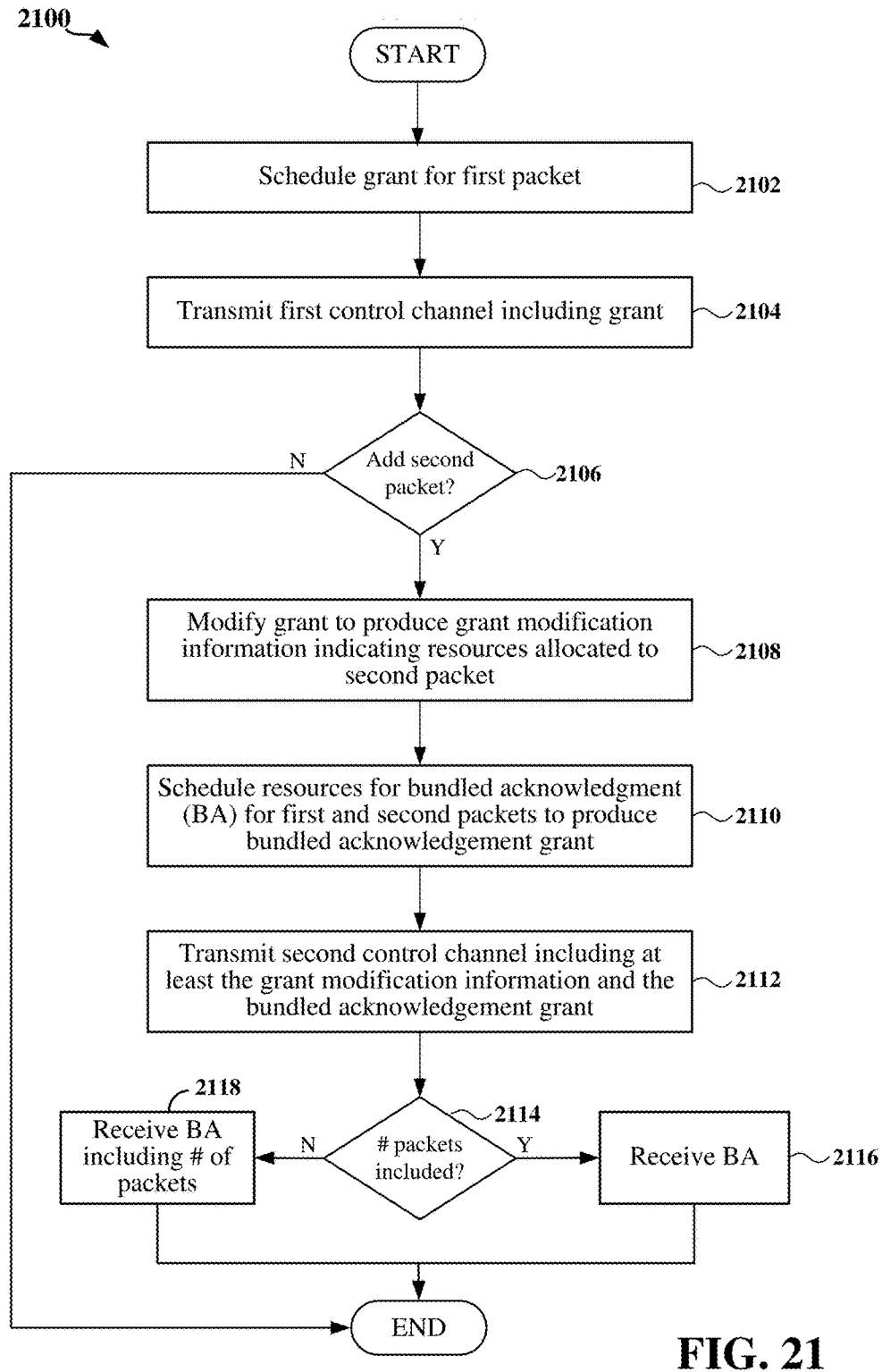
FIG. 21 is a flow chart illustrating another exemplary process for scheduling a grant utilizing multiple control signals according to some aspects of the present disclosure.

FIG. 21 is a flow chart illustrating an exemplary process 2100 for scheduling a grant utilizing multiple control signals in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the scheduling entity 700 illustrated in FIG. 7. In some examples, the process 2100 may be carried out by any suitable apparatus or means for carrying out the functions or algorithm described below.

At block 2102, the scheduling entity may schedule a grant for a first packet for a scheduled entity. For example, the resource assignment and scheduling circuitry 741 shown and described in reference to FIG. 7 above may schedule the grant for the packet. At block 2104, the scheduling entity may transmit a first control channel (e.g., a PDCCH) including first control information (e.g., DCI) that includes the grant for the first packet to the scheduled entity. For example, the resource assignment and scheduling circuitry 741, DL traffic and control channel generation and transmission circuitry 742 and transceiver 710 shown and described in reference to FIG. 7 above may generate and transmit the first control channel to the scheduled entity.

At block 2106, the scheduling entity may determine whether to add a second packet to the grant. In some examples, the scheduling entity may determine that the channel between the scheduling entity and the scheduled entity can support one or more additional MIMO layers (e.g., based on an updated CQI or SRS received from the scheduled entity) or may determine that an additional urgent packet (e.g., an Ultra Reliable Low Latency Communication (URLLC) packet) may need to be transmitted to the scheduled entity, and therefore, may determine that the second packet should be added to the grant. For example, the resource assignment and scheduling circuitry 741 shown and described in reference to FIG. 7 above may determine whether to add a second packet to the grant.

If the scheduling entity determines that a second packet should be added to the grant (Y branch of block 2106), at block 2108, the scheduling entity may modify the grant to produce grant modification information indicating at least resources (e.g., time-frequency resources) allocated to the second packet. For example, the first packet may be scheduled on a first set of resource elements and the second packet may be scheduled on a second set of resource elements. In some examples, the first and second sets of resource elements are the same or at least partially overlap (e.g., the packets are scheduled on the same set or overlapping sets of resource elements). In other examples, the first and second sets of resource elements are different. In examples in which the packets are scheduled on the same (or overlapping) sets of resource elements, each packet may be scheduled on a different set of one or more MIMO layers. For example, the first packet may be scheduled on a first set of one or more MIMO layers and the second packet may be scheduled on a second set of one or more MIMO layers, where each set of MIMO layers is different (non-overlapping). For example, the resource assignment and scheduling circuitry 741 shown and described in reference to FIG. 7 above may modify the grant.

At block 2110, the scheduling entity may further schedule resources for a bundled acknowledgement for the first and second grants to produce a bundled acknowledgement grant. For example, the resource assignment and scheduling circuitry 741 may schedule the bundled acknowledgement grant.

At block 2110, the scheduling entity may transmit a second control channel (e.g., PDCCH) including second control information (e.g., DCI) that includes at least the grant modification information and the bundled acknowledgement grant to the scheduled entity. In some examples, the second control information (DCI) may be transmitted within the same PDCCH as the first control information. In some examples, the first and second control channels may be separately transmitted within the same slot or different slots. In some examples, the second control information may also include the unmodified properties of the grant. In some examples, the bundled acknowledgement grant may further indicate the number of packets associated with the bundled acknowledgement grant. For example, the resource assignment and scheduling circuitry 741, DL traffic and control channel generation and transmission circuitry 742 and transceiver 710 shown and described in reference to FIG. 7 above may transmit the second control channel to the scheduled entity.

At block 2114, the scheduling entity may determine whether the bundled acknowledgement grant indicated the number of packets associated with the bundled acknowledgement. If the number of packets was included in the bundled acknowledgement grant (Y branch of block 2114), after transmission of the first and second packets, at block 2116, the scheduling entity may receive a bundled acknowledgement (ACK/NACK) from the scheduled entity that collectively acknowledges both of the first and second packets. For example, the UL traffic and control channel reception and processing circuitry 743 and transceiver 710 shown and described in reference to FIG. 7 above may receive the bundled acknowledgement from the scheduled entity.

If the number of packets was not included in the bundled acknowledgement grant (N branch of block 2114), after transmission of the first and second packets, at block 2118, the scheduling entity may receive a bundled acknowledgement (ACK/NACK) from the scheduled entity that further includes an indication of the number of packets received at the scheduled entity. For example, the UL traffic and control channel reception and processing circuitry 743 and transceiver 710 shown and described in reference to FIG. 7 above may receive the bundled acknowledgement from the scheduled entity.

In one configuration, a scheduling entity in a wireless communication network includes means for scheduling a grant including a downlink assignment or an uplink grant for a first packet for a first scheduled entity of a set of one or more scheduled entities in wireless communication with the scheduling entity and means for transmitting a first control channel including first control information to the first scheduled entity, where the first control information includes the grant for the first packet. The method further includes means for modifying at least one property of a plurality of properties of the grant to produce grant modification information and means for transmitting a second control channel including second control information to the first scheduled entity, where the second control information includes at least the grant modification information.

In one aspect, the aforementioned means for scheduling the grant and means for modifying at least one property of the grant may be the processor(s) 704 shown in FIG. 7 configured to perform the functions recited by the aforementioned means. For example, the aforementioned means for scheduling the grant and means for modifying the grant may include the resource assignment and scheduling circuitry 741 shown in FIG. 7. In another aspect, the aforementioned means for transmitting the first control channel and means for transmitting the second control channel may be the processor(s) 704 shown in FIG. 7 configured to perform the functions recited by the aforementioned means. For example, the aforementioned means for transmitting the first control channel and the means for transmitting the second control channel may include the DL traffic and control channel generation and transmission circuitry 742 shown in FIG. 7, together with the transceiver 710 shown in FIG. 7. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6, 7 and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduling entity to schedule transmissions with a set of one or more scheduled entities in a wireless communication network, the method comprising:
scheduling a grant comprising a downlink assignment or an uplink grant for a first packet for a first scheduled entity of the set of one or more scheduled entities;
transmitting a first control channel comprising first control information to the first scheduled entity, wherein the first control information comprises the grant for the first packet;
modifying at least one property of a plurality of properties of the grant to produce grant modification information;
adding a second packet to the grant, wherein the first packet is scheduled on a first set of resource elements within a slot and the second packet is scheduled on a second set of resource elements within the slot; and
transmitting a second control channel comprising second control information to the first scheduled entity, wherein the second control information comprises at least the grant modification information and is separate from the first control information.

2. The method of claim 1, wherein the grant modification information comprises an indication that at least part of the first packet will be punctured.

3. The method of claim 2, wherein the second packet comprises ultra-reliable low latency communication (URLLC) traffic for transmission, and wherein the method further comprises:
identifying at least portion of resource elements (REs) allocated to the first packet that are needed to support transmission of the second packet to produce punctured resource information; and
generating the grant modification information comprising the punctured resource information.

4. The method of claim 1, wherein the first packet is scheduled on a first set of one or more multiple-input-multiple-output (MIMO) layers and the second packet is scheduled on a second set of one or more MIMO layers.

5. The method of claim 4, wherein the first set of resource elements comprises at least part of the second set of resource elements.

6. The method of claim 5, further comprising:
assigning a first hybrid automatic repeat request (HARQ) process identifier (ID) to the first packet; and
assigning a second HARQ process ID to the second packet.

7. The method of claim 6, wherein the first HARQ process ID and the second HARQ process ID are the same.

8. The method of claim 1, further comprising:
scheduling resources for a block acknowledgement comprising a respective acknowledgement bit for each of the first packet and the second packet to produce a block acknowledgement grant; and
transmitting the block acknowledgement grant to the first scheduled entity within the first control channel.

9. The method of claim 1, further comprising:
scheduling resources for a bundled acknowledgement comprising a single acknowledgement bit for both the first packet and the second packet to produce a bundled acknowledgement grant; and
transmitting the bundled acknowledgement grant to the first scheduled entity within at least one of the first control channel and the second control channel.

10. The method of claim 9, wherein the bundled acknowledgement grant further comprises an indication of a number of packets associated with the bundled acknowledgement grant.

11. The method of claim 9, further comprising:
transmitting the first packet and the second packet to the first scheduled entity;
receiving bundled acknowledgement information utilizing the bundled acknowledgement grant from the first scheduled entity; and
receiving an indication of a number of packets associated with the bundled acknowledgement information from the first scheduled entity.

12. The method of claim 1, wherein adding the second packet to the grant further comprises:
selecting a first modulation and coding scheme (MCS) for the first packet; and
selecting a second MCS for the second packet, wherein the second MCS is different than the first MCS.

13. The method of claim 1, wherein adding the second packet to the grant further comprises:
identifying a first retransmission sequence number of the first packet and a second retransmission sequence number of the second packet, wherein the first retransmission sequence number is different than the second retransmission sequence number.

14. The method of claim 1, wherein modifying the at least one property of the plurality of properties of the grant to produce the grant modification information further comprises:
modifying at least one of a time-frequency resource allocation of the grant, a waveform utilized for the grant, or a transmit-diversity scheme utilized for the grant to produce the grant modification information.

15. The method of claim 1, wherein the first control information further comprises a respective modification indication for each property of the plurality of properties of the grant.

16. A method for a scheduling entity to schedule transmissions with a set of one or more scheduled entities in a wireless communication network, the method comprising:
scheduling a grant comprising a downlink assignment or an uplink grant for a first packet for a first scheduled entity of the set of one or more scheduled entities;
transmitting a first control channel comprising first control information to the first scheduled entity, wherein the first control information comprises the grant for the first packet;
modifying at least one property of a plurality of properties of the grant to produce grant modification information; and
transmitting a second control channel comprising second control information to the first scheduled entity, wherein the second control information comprises at least the grant modification information and is separate from the first control information, and, wherein the first control information further comprises a respective modification indication for each property of the plurality of properties of the grant, and the respective modification indication of each of the plurality of properties indicates whether the respective property is further modifiable.

17. The method of claim 16, wherein the respective modification indication of each of the plurality of properties is set to final when the respective property is no longer modifiable.

18. A scheduling entity in a wireless communication network, comprising:
a transceiver for wireless communication with a set of one or more scheduled entities;
a memory; and
a processor communicatively coupled to the transceiver and the memory, the processor configured to:
schedule a grant comprising a downlink assignment or an uplink grant for a first packet for a first scheduled entity of a set of one or more scheduled entities in wireless communication with the scheduling entity;
transmit a first control channel comprising first control information to the first scheduled entity via the transceiver, wherein the first control information comprises the grant for the first packet;
modify at least one property of a plurality of properties of the grant to produce grant modification information;
add a second packet to the grant, wherein the first packet is scheduled on a first set of resource elements within a slot and the second packet is scheduled on a second set of resource elements within the slot; and
transmit a second control channel comprising second control information to the first scheduled entity via the transceiver, wherein the second control information comprises at least the grant modification information and is separate from the first control information.

19. The scheduling entity of claim 18, wherein the grant modification information comprises an indication that at least part of the first packet will be punctured.

20. The scheduling entity of claim 19, wherein the second packet comprises ultra-reliable low latency communication (URLLC) traffic for transmission, and the process is further configured to:
identify at least portion of resource elements (REs) allocated to the first packet that are needed to support transmission of the second packet to produce punctured resource information; and
generate the grant modification information comprising the punctured resource information.

21. The scheduling entity of claim 18, wherein the first packet is scheduled on a first set of one or more multiple-input-multiple-output (MIMO) layers and the second packet is scheduled on a second set of one or more MIMO layers.

22. The scheduling entity of claim 21, wherein the first set of resource elements comprises at least part of the second set of resource elements.

23. The scheduling entity of claim 22, wherein the processor is further configured to:
assign a first hybrid automatic repeat request (HARQ) process identifier (ID) to the first packet; and
assign a second HARQ process ID to the second packet.

24. The scheduling entity of claim 23, wherein the first HARQ process ID and the second HARQ process ID are the same.

25. The scheduling entity of claim 18, wherein the processor is further configured to:
schedule resources for a block acknowledgement comprising a respective acknowledgement bit for each of the first packet and the second packet to produce a block acknowledgement grant; and
transmit the block acknowledgement grant to the first scheduled entity within the first control channel.

26. The scheduling entity of claim 18, wherein the processor is further configured to:
schedule resources for a bundled acknowledgement comprising a single acknowledgement bit for both the first packet and the second packet to produce a bundled acknowledgement grant; and
transmit the bundled acknowledgement grant to the first scheduled entity within at least one of the first control channel and the second control channel.

27. The scheduling entity of claim 26, wherein the bundled acknowledgement grant further comprises an indication of a number of packets associated with the bundled acknowledgement grant.

28. The scheduling entity of claim 26, wherein the processor is further configured to:
transmit the first packet and the second packet to the first scheduled entity via the transceiver;
receive bundled acknowledgement information utilizing the bundled acknowledgement grant from the first scheduled entity via the transceiver; and
receive an indication of a number of packets associated with the bundled acknowledgement information from the first scheduled entity via the transceiver.

29. The scheduling entity of claim 18, wherein the processor is further configured to:
select a first modulation and coding scheme (MCS) for the first packet; and
select a second MCS for the second packet, wherein the second MCS is different than the first MCS.

30. The scheduling entity of claim 18, wherein the processor is further configured to:
identify a first retransmission sequence number of the first packet and a second retransmission sequence number of the second packet, wherein the first retransmission sequence number is different than the second retransmission sequence number.

31. The scheduling entity of claim 18, wherein the processor is further configured to:
modify at least one of a time-frequency resource allocation of the grant, a waveform utilized for the grant, or a transmit-diversity scheme utilized for the grant to produce the grant modification information.

32. The scheduling entity of claim 18, wherein the first control information further comprises a respective modification indication for each property of the plurality of properties of the grant.

33. A scheduling entity in a wireless communication network, comprising:
a transceiver for wireless communication with a set of one or more scheduled entities;
a memory; and
a processor communicatively coupled to the transceiver and the memory, the processor configured to:
schedule a grant comprising a downlink assignment or an uplink grant for a first packet for a first scheduled entity of a set of one or more scheduled entities in wireless communication with the scheduling entity;
transmit a first control channel comprising first control information to the first scheduled entity via the transceiver, wherein the first control information comprises the grant for the first packet;

modify at least one property of a plurality of properties of the grant to produce grant modification information; and transmit a second control channel comprising second control information to the first scheduled entity via the transceiver, wherein the second control information comprises at least the grant modification information and is separate from the first control information, wherein the first control information further comprises a respective modification indication for each property of the plurality of properties of the grant, and the respective modification indication of each of the plurality of properties indicates whether the respective property is further modifiable.

34. The scheduling entity of claim 33, wherein the respective modification indication of each of the plurality of properties is set to final when the respective property is no longer modifiable.

35. A scheduling entity in a wireless communication network, comprising:
means for scheduling a grant comprising a downlink assignment or an uplink grant for a first packet for a first scheduled entity of a set of one or more scheduled entities in wireless communication with the scheduling entity;
means for transmitting a first control channel comprising first control information to the first scheduled entity, wherein the first control information comprises the grant for the first packet;
means for modifying at least one property of a plurality of properties of the grant to produce grant modification information;
means for adding a second packet to the grant, wherein the first packet is scheduled on a first set of resource elements within a slot and the second packet is scheduled on a second set of resource elements within the slot; and
means for transmitting a second control channel comprising second control information to the first scheduled entity, wherein the second control information comprises at least the grant modification information and is separate from the first control information.

36. The scheduling entity of claim 35, wherein the grant modification information comprises an indication that at least part of the first packet will be punctured.

37. The scheduling entity of claim 36, wherein the second packet comprises ultra-reliable low latency communication (URLLC) traffic for transmission, and further comprising:
means for identifying at least portion of resource elements (REs) allocated to the first packet that are needed to support transmission of the second packet to produce punctured resource information; and
means for generating the grant modification information comprising the punctured resource information.

38. The scheduling entity of claim 35, wherein the first packet is scheduled on a first set of one or more multiple-input-multiple-output (MIMO) layers and the second packet is scheduled on a second set of one or more MIMO layers.

39. The scheduling entity of claim 38, wherein the first set of resource elements comprises at least part of the second set of resource elements.

40. The scheduling entity of claim 39, further comprising:
means for assigning a first hybrid automatic repeat request (HARQ) process identifier (ID) to the first packet; and
means for assigning a second HARQ process ID to the second packet.

41. The scheduling entity of claim 40, wherein the first HARQ process ID and the second HARQ process ID are the same.

42. The scheduling entity of claim 35, further comprising:
means for scheduling resources for a bundled acknowledgement comprising a single acknowledgement bit for both the first packet and the second packet to produce a bundled acknowledgement grant; and
means for transmitting the bundled acknowledgement grant to the first scheduled entity within at least one of the first control channel and the second control channel.

43. The scheduling entity of claim 42, further comprising:
means for transmitting the first packet and the second packet to the first scheduled entity;
means for receiving bundled acknowledgement information utilizing the bundled acknowledgement grant from the first scheduled entity; and
means for receiving an indication of a number of packets associated with the bundled acknowledgement information from the first scheduled entity.

44. The scheduling entity of claim 35, wherein the bundled acknowledgement grant further comprises an indication of a number of packets associated with the bundled acknowledgement grant.

45. The scheduling entity of claim 35, wherein the means for adding the second packet to the grant further comprises:
means for selecting a first modulation and coding scheme (MCS) for the first packet; and
means for selecting a second MCS for the second packet, wherein the second MCS is different than the first MCS.

46. The scheduling entity of claim 35, wherein the means for adding the second packet to the grant further comprises:
means for identifying a first retransmission sequence number of the first packet and a second retransmission sequence number of the second packet, wherein the first retransmission sequence number is different than the second retransmission sequence number.

47. The scheduling entity of claim 35, wherein the means for modifying the at least one property of the plurality of properties of the grant to produce the grant modification information further comprises:
modifying at least one of a time-frequency resource allocation of the grant, a waveform utilized for the grant, or a transmit-diversity scheme utilized for the grant to produce the grant modification information.

48. A non-transitory computer-readable medium storing computer executable code, comprising code for causing a scheduling entity in a wireless communication network to:
schedule a grant comprising a downlink assignment or an uplink grant for a first packet for a first scheduled entity of a set of one or more scheduled entities in wireless communication with the scheduling entity;
transmit a first control channel comprising first control information to the first scheduled entity, wherein the first control information comprises the grant for the first packet;
modify at least one property of a plurality of properties of the grant to produce grant modification information;
add a second packet to the grant, wherein the first packet is scheduled on a first set of resource elements within a slot and the second packet is scheduled on a second set of resource elements within the slot; and
transmit a second control channel comprising second control information to the first scheduled entity, wherein the second control information comprises at least the grant modification information and is separate from the first control information.

49. The non-transitory computer-readable medium of claim 48, wherein the grant modification information comprises an indication that at least part of the first packet will be punctured.

50. The non-transitory computer-readable medium of claim 49, wherein the second packet comprises ultra-reliable low latency communication (URLLC) traffic for transmission, and further comprising code for causing the scheduling entity to;
identify at least portion of resource elements (REs) allocated to the first packet that are needed to support transmission of the second packet to produce punctured resource information; and
generate the grant modification information comprising the punctured resource information.

51. The non-transitory computer-readable medium of claim 48, wherein the first packet is scheduled on a first set of one or more multiple-input-multiple-output (MIMO) layers and the second packet is scheduled on a second set of one or more MIMO layers.

52. The non-transitory computer-readable medium of claim 51, wherein the first set of resource elements comprises at least part of the second set of resource elements.

53. The non-transitory computer-readable medium of claim 52, further comprising code for causing the scheduling entity to:
assign a first hybrid automatic repeat request (HARQ) process identifier (ID) to the first packet; and
assign a second HARQ process ID to the second packet.

54. The non-transitory computer-readable medium of claim 53, wherein the first HARQ process ID and the second HARQ process ID are the same.

55. The non-transitory computer-readable medium of claim 48, further comprising code for causing the scheduling entity to:
schedule resources for a bundled acknowledgement comprising a single acknowledgement bit for both the first packet and the second packet to produce a bundled acknowledgement grant; and
transmit the bundled acknowledgement grant to the first scheduled entity within at least one of the first control channel and the second control channel.

56. The non-transitory computer-readable medium of claim 55, wherein the bundled acknowledgement grant further comprises an indication of a number of packets associated with the bundled acknowledgement grant.

57. The non-transitory computer-readable medium of claim 55, further comprising code for causing the scheduling entity to:
transmit the first packet and the second packet to the first scheduled entity via the transceiver;
receive bundled acknowledgement information utilizing the bundled acknowledgement grant from the first scheduled entity via the transceiver; and
receive an indication of a number of packets associated with the bundled acknowledgement information from the first scheduled entity via the transceiver.

58. The non-transitory computer-readable medium of claim 48, further comprising code for causing the scheduling entity to:
select a first modulation and coding scheme (MCS) for the first packet; and
select a second MCS for the second packet, wherein the second MCS is different than the first MCS.

59. The non-transitory computer-readable medium of claim 48, further comprising code for causing the scheduling entity to:
identify a first retransmission sequence number of the first packet and a second retransmission sequence number of the second packet, wherein the first retransmission sequence number is different than the second retransmission sequence number.

60. The non-transitory computer-readable medium of claim 48, further comprising code for causing the scheduling entity to:
modify at least one of a time-frequency resource allocation of the grant, a waveform utilized for the grant, or a transmit-diversity scheme utilized for the grant to produce the grant modification information.

* * * * *